(12) United States Patent
Aura et al.

(10) Patent No.: US 7,624,264 B2
(45) Date of Patent: *Nov. 24, 2009

(54) USING TIME TO DETERMINE A HASH EXTENSION

(75) Inventors: Tuomas Aura, Cambridge (GB); Michael Roe, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/165,412

(22) Filed: Jun. 22, 2005

(65) Prior Publication Data

US 2006/0005014 A1    Jan. 5, 2006

Related U.S. Application Data

(63) Continuation-in-part of application No. 10/401,241, filed on Mar. 27, 2003, now Pat. No. 7,409,544.

(51) Int. Cl.
*H04L 9/00* (2006.01)
*G06F 7/04* (2006.01)
*H04L 9/32* (2006.01)

(52) U.S. Cl. ........................ 713/162; 713/163; 713/164; 713/169; 713/170; 726/3; 726/4; 726/5; 726/6; 726/7; 380/229; 380/223; 380/231; 380/232

(58) Field of Classification Search .................. 713/162
See application file for complete search history.

(56) References Cited

U.S. PATENT DOCUMENTS 5,473,691 A    12/1995   Menezes et al.
5,511,122 A    4/1996    Atkinson
5,563,998 A    10/1996   Yakish et al.

(Continued)

FOREIGN PATENT DOCUMENTS

EP    1333635    8/2003

(Continued)

OTHER PUBLICATIONS

Aura, T. *Cryptographically Generated Addresses (CGA)*. RFC 3972, Mar. 2005, pp. 1-21.

(Continued)

*Primary Examiner*—Longbit Chai
(74) *Attorney, Agent, or Firm*—Merchant & Gould P.C.

(57) ABSTRACT

An extensible cryptographically generated network address may be generated by forming at least a portion of the network address as a portion of a first hash value. The first hash value may be formed by generating a plurality of hash values by hashing a concatenation of a public key and a modifier using a second hash function until a stop condition. The stop condition may include computing the plurality of hash values for a period of time specified by a time parameter. A second hash value may be selected from the plurality of hash values, and the modifier used to compute that hash value may be stored. A hash indicator may be generated which indicates the selected second hash value. The first hash value may be generated as a hash of a concatenation of at least the public key and the modifier. At least a portion of the node-selectable portion of the network address may include at least a portion of the first hash value.

19 Claims, 13 Drawing Sheets

U.S. PATENT DOCUMENTS

| | | | |
|---|---|---|---|
| 5,673,319 | A | 9/1997 | Bellare et al. |
| 5,729,608 | A | 3/1998 | Janson et al. |
| 5,778,065 | A | 7/1998 | Hauser et al. |
| 5,784,562 | A | 7/1998 | Diener |
| 5,787,172 | A | 7/1998 | Arnold |
| 5,892,904 | A | 4/1999 | Atkinson et al. |
| 5,903,721 | A | 5/1999 | Sixtus et al. |
| 5,944,794 | A | 8/1999 | Okamoto et al. |
| 6,028,938 | A | 2/2000 | Malkis et al. |
| 6,055,234 | A | 4/2000 | Aramaki |
| 6,055,236 | A | 4/2000 | Nessett et al. |
| 6,088,700 | A | 7/2000 | Larsen et al. |
| 6,101,499 | A | 8/2000 | Ford et al. |
| 6,108,673 | A | 8/2000 | Brandt et al. |
| RE36,946 | E | 11/2000 | Diffie et al. |
| 6,148,405 | A | 11/2000 | Liao et al. |
| 6,175,833 | B1 | 1/2001 | West et al. |
| 6,229,806 | B1 | 5/2001 | Lockhart et al. |
| 6,237,035 | B1 | 5/2001 | Himmel et al. |
| 6,247,029 | B1 | 6/2001 | Kelley et al. |
| 6,367,012 | B1 | 4/2002 | Atkinson et al. |
| 6,421,673 | B1 | 7/2002 | Caldwell et al. |
| 6,424,981 | B1 | 7/2002 | Isaac et al. |
| 6,526,506 | B1 | 2/2003 | Lewis |
| 6,600,823 | B1 | 7/2003 | Hayosh |
| 6,615,348 | B1 | 9/2003 | Gibbs |
| 6,687,755 | B1 | 2/2004 | Ford et al. |
| 6,732,110 | B2 | 5/2004 | Rjaibi et al. |
| 6,832,322 | B1 | 12/2004 | Boden et al. |
| 6,944,672 | B2 | 9/2005 | Crow et al. |
| 6,957,346 | B1 | 10/2005 | Kivinen et al. |
| 7,032,242 | B1 | 4/2006 | Grabelsky et al. |
| 7,134,019 | B2 | 11/2006 | Shelest et al. |
| 7,216,233 | B1 | 5/2007 | Krueger |
| 7,370,197 | B2 | 5/2008 | Huitema |
| 7,409,544 | B2 | 8/2008 | Aura |
| 2001/0010720 | A1 | 8/2001 | Kimball et al. |
| 2002/0133607 | A1 | 9/2002 | Nikander |
| 2002/0152380 | A1 | 10/2002 | O'Shea et al. |
| 2002/0152384 | A1 | 10/2002 | Shelest et al. |
| 2003/0028790 | A1 | 2/2003 | Blerumer |
| 2003/0065934 | A1 | 4/2003 | Angelo et al. |
| 2003/0070067 | A1 | 4/2003 | Saito |
| 2003/0120929 | A1 | 6/2003 | Hoffstein et al. |
| 2003/0142823 | A1 | 7/2003 | Swander et al. |
| 2003/0233568 | A1 | 12/2003 | Maufer et al. |
| 2004/0008845 | A1 | 1/2004 | Le et al. |
| 2004/0010683 | A1 | 1/2004 | Huitema |
| 2004/0088537 | A1 | 5/2004 | Swander et al. |
| 2004/0151322 | A1 | 8/2004 | Sovio et al. |
| 2004/0158714 | A1 | 8/2004 | Peyravian et al. |
| 2004/0193875 | A1 | 9/2004 | Aura |
| 2004/0225881 | A1 | 11/2004 | Walmsley |
| 2004/0249757 | A1 | 12/2004 | Walmsley |
| 2006/0020796 | A1 | 1/2006 | Aura et al. |
| 2006/0020807 | A1 | 1/2006 | Aura et al. |
| 2006/0077908 | A1 | 4/2006 | Park et al. |

FOREIGN PATENT DOCUMENTS

| | | |
|---|---|---|
| WO | WO 2006068450 | 6/2006 |

OTHER PUBLICATIONS

Housley, R. *Using Advanced Encryption Standard (AES) CCM Mode with IPsec Encapsulating Security Payload (ESP)*. RFC 4309, Dec. 2005, pp. 1-13.

ISPEC. *Minutes of IPSEC Working Group Meeting*. Proceedings of the 52$^{nd}$ Internet Engineering Task Force, Dec. 9-14, 2001, Salt Lake City, U.S.A. Dec. 12, 2001.

Kaufman, C. *Internet Key Exchange (IKEv2) Protocol*. RFC 4306, Dec. 2005, pp. 1-93.

Kent, C. and Mogul, J. *Fragmentation Considered Harmful*. Computer Communication Review, (Association of Computer Machinery), 25(1) 75-87 (Jan. 1995).

Kent, S. and Seo, K. *Security Architecture for the Internet Protocol*. RFC 4301, Dec. 2005, pp. 1-95.

Kent, S. *IP Authentication Header*. RFC 4302, Dec. 2005, pp. 1-35.

Kent, S. *IP Encapsulating Security Payload (ESP)*. RFC 4303, Dec. 2005, pp. 1-42.

Laganier, J. and Montenegro, G. *Using IKE with IPv6 Cryptotgraphically Generated Address. Network Working Group, Internet-Draft*, Feb. 24, 2003, pp. 1-14.

Link, B., Hager, T. and Flaks J. *RTP Payload Format for AC-3 Audio*. RFC 4184, Oct. 2005, pp. 1-13.

Nir, Y. *Repeated Authentication in Internet Key Exchange (IKEv2) Protocol*. RFC 4478, Apr. 2006, pp. 1-5.

Tanenbaum, Andrew S. *Computer Networks, Ch. 4*. Prentice-Hall, 1989.

Van De Snepscheut, JLA. *The Sliding Window Protocol Revisited*. Formal Aspects of Computing vol. 7, 1995, pp. 3-17.

PCT International Search Report in PCT/US06/25342, Feb. 6, 2008.

"Computer Networks", AS Tannenbaum, Prentice-Hall, 1989.

Anderson, Ross, Stajano, Frank, Lee, Jong-Hyeon, "Security Policies", 43 pgs.

Aura, Tuomas, Cryptographically Generated Addresses (CGA), Microsoft Research, Roger Needham Bldg, Cambridge CB3 OFB, UK.

Balfanz, Dirk, Smetters, Paul Stewart, Wong, Chi H., "Talking to Strangers: Authentication in Ad-Hoc Wireless Networks", Xerox Palo Alto Research Center. 13 pgs.

Gehrmann, Christian, Mitchell, Chris J., Nyberg, Kaisa, "Manual Authentication for Wireless Devices", Jan. 23, 2004, pp. 1-9.

Hinden et al., "IP Version 6 Addressing Architecture," (Mar. 10, 2000).

Hinden et al., IP version 6 Working Group Minutes, Minneapolia IETF, Mar. 18, 2002 [accessed May 29, 2005 from http://www.ietf.org/proceedings/02mar/minutes/ipv6.htm], 13 pgs.

Intel Technology Journal, "Interoperable Home Infrastructure", vol. 6, Issue 4, Published Nov. 15, 2002, ISSN 1535-766X, 78 pgs.

Johnson et al., Mobility Support in IPv6, (Apr. 27, 2000).

Kempf et al., "Threat Analysis for IPv6 Public Multi-Access Links", draft-kempf-ipng-netaccess-threats-00.txt, Nov. 2001, 7 pgs.

Kent, Christopher A., Mogul, Jeffrey C., "Fragmentation Considered Harmful", Digital Equipment Corporation, Western Research Lab (originally pub. In Proc. SIGCOMM '87, vol. 17, No. 5, Oct. 1987, 13 pgs.

Kent, S. and Atkinson, R. "Security Architecture for the Internet Protocol," RFC 2401, Nov. 1998, [62 pages].

Koskiande, Timo. "Security in Mobile IPv6," Apr. 18, 2002, pp. 1-14.

McCune, Jonathan M., Perrig, Adrian, Reiter, Michael K., "Seeing-Is-Believing: Using Camera Phones for Human-Verifiable Authentication", School of Computer Science, Carnegie Mellon University, Nov. 2004, CMU-CS-04-174, pp. 1-20.

Nikander et al., "Threat Models introduced by Mobile IPv6 and requirements for Security in Mobile IPv6", draft-team-mobileip-mipv6-sec-reqts-00.txt, Jul. 12, 2001, 28 pgs.

Nikander et al., Binding Authentication Key Establishment Protocol for Mobile IPv6, draft-perkins-bake-01.txt, Jul. 2, 2001, 42 pgs.

Nordmark, "Allocating bit in IID for Mobile IPv6", Mar. 2002, [accessed May 29, 2005 from http://www.ietf.org/proceedings/02mar/slides/ipv6-13.pdf], 8 pgs.

Nordmark, "Reserving Space in the Interface ID", from Mar. 2002 [accessed May 29, 2005 from http://www.ietf.org/proceedings/02mar/slides/ipv6-14.pdf], 6 pgs.

O'Shea et al. "Child-Proof Authentication for MOPv6(CAM)," vol. 31, No. 2, ACM SIGCOMM omputer Communications Review, Apr. 2001, 5 pgs.

Thomas, "Binding Updates Security", draft-thomas-mobileip-busec-00.txt, Nov. 2, 2001, 13 pgs.

Thomson et al., IPv6 Stateless Address Autoconfiguration, RFC 1971 (Aug. 1996) 22 pgs. downloaded from: http://www.ietf.org/rfc1971.txt; on Apr. 11, 2006.

IETF Proceedings, "Security and Mobile IPv6", Mar. 2001 [accessed May 29, 2005 from http://www.ietf.org/proceedings/01mar/slides/mobileip-9], 1 pg.
Final OA issued in U.S. Appl. No. 10/242,705, Mail Date: Feb. 9, 2007.
Office Action issued in U.S. Appl. No. 10/242,705, Mail Date: Feb. 16, 2006.
Office Action issued in U.S. Appl. No. 10/242,705, Mail Date: Aug. 8, 2006.
Office Action issued in U.S. Appl. No. 10/401,241, Mail Date: Jan. 25, 2007.
Office Action issued in U.S. Appl. No. 10/401,241, Mail Date: Oct. 19, 2007.
Office Action issued in U.S. Appl. No. 11/170,296, Mail Date: Dec. 3, 2008.
Non Final Office Action Issued in U.S Appl. No. 11/159,555 dated Apr. 9, 2009.
"Glossary for the Linux FreeS/WAN project," (Publication Date Not Available), [34 pages].
Bassil, Alessandro; Laganier, Julien. "Towards an IPv6-based Security Framework for Distributed Storage Resources," Communications and Multimedia Security CMS 2003, Oct. 2-3, 2003, [9 pages].
Benantar, M. "The Internet Public Key Infrastructure," IBM Systems Journal, vol. 40, No. 3, 2001, pp. 648-665.
Cheng, P.C.; Garay, J.A; Herzberg, A.; Krawczyk, H. "A Security Architecture for the Internet Protocol," 1998, vol. 37, No, 1, pp. 42-60.
Cheng, Pau-Chen; Garay, Juan A.; Herzberg, Amir; Krawczyk, Hugo. "Design and Implementation of Modular Key Management Protocol and IP Secure Tunnel on AIX," Jun. 1995, [15 pages].
Cheng, PC. "An Architecture for the Internet Key Exchange Protocol," IBM Systems Journal, vol. 40, No. 3, 2001, pp. 721-746.
Clark, David D. "IP Datagram Reassembly Algorithms," RFC 815, Jul. 1982, [11 pages].
Higginson, Peter L.; Shand, Michael C. "Development of Router Clusters to Provide Fast Failover in IP Networks," Digital Technical Journal vol. 9 No. 3, 1997, pp. 32-41.
Kent et al. "IP Encapsulating Security Payload (ESP)," The Internet Society, RFC 2406, Nov. 1998, [34 pages].
Koskiahde, Timo. "Security in Mobile IPv6," Apr. 18, 2002, pp. 1-14.
Maughan et al. "Internet Security Association and Key Management Protocol (ISAKMP)," The Internet Society, RFC 2408, Nov. 1998, [141 pages].
Shannon, Colleen; Moore, David; Claffy, K. "Characteristics of Fragmented IP Traffic on Internet Links," Internet Measurement Conference. 2001, pp. 83-97.
M. Burrows et al., "A Logic of Authentication" Proceedings of the Royal Society of London Series A, 426, pp. 233-271 (1989).
S. Deering et al., "Version 6 (IPv6) Specification" RFC2460 (Dec. 1998).
"Secure Hash Standard," NIST, FIPS PUB 180-1, http://csrc.nist.goc/fips/fip180-1.txt. (Apr. 1995).
Harkins et al., "The Internet Key Exchange (IKE)," RFC2409 (Nov. 1998).
Hinden et al., "IP Version 6 Addressing Architecture," (Feb. 2, 2001).
Huitema, "Ipv6 The New Internet Protocol," Prentice Hall PTR, ISBN 0-13-850505-5 (1998).
Johnson et al., "Mobility Support in IPv6," (Nov. 17, 2000).
Kent et al., "IP Authentication Header," RFC2402 (Nov. 1998).

Mills, "Simple Network Time Protocol (SNMP) Version 4 for IPv6 and OSI," RFC2030 (Oct. 1996).
Perkins, "IP Mobility Support," RFC2002 (Oct. 1996).
Thompson et al., "IPv6 Stateless Address Autoconfiguration," RFC2462 (Dec. 1998).
Kent et al., "Security Architecture for the Internet Protocol," RFC2401 (Nov. 1998).
Aura et al., *Security of Internet Location Management*, In Proc. 18th Annual Computer Security Applications Conference, IEEE Press, Nevada (Dec. 2002).
Blaze et al., *The Keynote Trust-Management System Version 2*, IETF Network Working Group (Sep. 1999).
Eastlake, *Domain Name System Security Extensions*, IETF Network Working Group (Mar. 1999).
Ellison et al., *SPKI Certificate Theory*, IETF Network Working Group (Sep. 1999).
Ferguson et al., *Network ingress Filtering: Defeating Denial Of Service Attacks Which Employ IP Source Address Spoofing*, IETF Network Working Group (May 2000).
Housléy et al., *Internet X.509 Public Key Infrastructure Certificate And Certificate Revocation List (CRL) Profile*, IETF Network Working Group (Apr. 2002).
Karn et al., *Photuris: Session-Key Management Protocol*, IETF Network Working Group (Mar. 1999).
Montenegro et al., *Statistically Unique And Cryptographically Verifiable Identifies And Addresses*, In Proc. ISOC Symposium on Network and Distributed System Security (NDSS 2002), San Diego (Feb. 2002).
Moskowitz, *Host Identity Payload And Protocol*, Internet-Draft draft-ietf-moskowitz-hip-06.txt, (Oct. 2001) (Work in progress).
Narten et al., *Privacy Extensions For Stateless Address Autoconfiguration in Ipv6*, IETF Network Working Group (Jan. 2001).
Narten et al., *Neighbor Discovery For IP Version 6 (IPv6)*, IETF Network Working Group, (Dec. 1998).
Nikander, *A Scaleable Architecture For IPv6 Address Ownership*, Internet-draft (Mar. 2001).
Okazaki et al., *Mipv6 Binding Updates Using Address Based Keys (Abks)*. Internet-Draft, (Oct. 2002).
Roe et al., *Authentication Of Mobile IPv6 Binding Updates And Acknowledgments*, Internet-Draft, IETF Mobile IP Working Group (Feb. 2002).
Savola. *Security Of Ipv6 Routing Header And Home Address Options*, Internet-draft, IETF (Dec. 2002).
Sharnir, *Identity-Based Cryptosystems And Signature Schemes*, In Advances in Cryptology: Proc, CRYPTO 84, vol. 196 of LNCS, pp. 47-53, (1998).
Arkko et al., *Securing IPv6 Neighbor Discovery And Router Discovery*, In Proc, 2002 ACM Workshop on Wireless Security (WiSe), pp. 77-86, (Sep. 2002) ACM Press.
Aura, *Cryptographically Generated Addresses (CGA)*; Internet-Draft, IETF Securing Neighbor Discovery Working Group (Feb. 2003).
O'Shea et. al., *Child-Proof Authentication For Mipv6 (CAM)*, ACM Computer Communications Review, 31(2) (Apr. 2001).
International Telecomminication Union. ITU-T recommendation X,690, *Information Technology—ASN.1 Encoding Rules: Specification Of Basic Encoding Rules (BER), Canonocal Encoding Rules (CER) And Distinguished Encoding Rules (DER)*, (Jul. 2002).

USING TIME TO DETERMINE A HASH EXTENSION

CROSS-REFERENCE TO RELATED APPLICATION(S)

This application is a continuation in part of and claims priority to U.S. patent application Ser. No. 10/401,241, filed Mar. 27, 2003, which is incorporated herein by reference.

BACKGROUND

Authentication is an important issue in many types of network communications. Many messages are meaningful only if the recipient can verify the identity of the sender. For example, in network communications, an often used form of identity is the network address used by a device to identify itself on the network. Messages are typically tagged with this form of identity, which can be used by a recipient to address a message in response. However, a nefarious party may easily send a message with a deceptive sender's address. Without an authentication mechanism verifying that the sender's network address contained in the message is actually the originating address, this form of identity is vulnerable to fraudulent misrepresentation.

In addition to sending unauthentic messages, a nefarious party may try to prevent other parties from communicating with each other. This type of threat is called denial-of-service. There are many types of denial-of-service attacks against communication systems. In computer networks, one particular type of denial-of-service attack is one where the attacker prevents a network node from obtaining a network address. More generally, in any system where an identifier or identity authentication is a pre-requisite for participation in the system, an attacker may try to prevent the participants from obtaining suitable identifiers.

Protocols typically address the problem of fraudulent misrepresentation and denial-of-service by implementing authentication services. The recipient of a message uses the authentication services to verify the identity of the sender of the message. The recipient then takes action based on the characteristics associated with the sender's identity.

The foregoing examples of the related art and limitations related therewith are intended to be illustrative and not exclusive. Other limitations of the related art will become apparent to those of skill in the art upon a reading of the specification and a study of the drawings.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Cryptographically generated addresses (CGAs) implement one example of authentication services. In one example, a CGA under the Internet Protocol version 6 (IPv6) protocol has some of the address bits, usually the 64-bit interface identifier, created from a cryptographic hash of the address owner's public key. Any IPv6 node capable of basic cryptographic operations could generate a CGA locally, and only the address and the public key are needed for verifying the signatures. In this manner, with a CGA, no third parties or additional infrastructure, such as a public-key infrastructure (PKI), is needed to verify signatures. Though initially promising, earlier contemplated CGA proposals present a major security weakness inherent in the 64-bit limit on the hash length.

A generic and extensible format for CGAs and an associated authentication mechanism may provide much of the security of heavyweight authentication mechanisms. In some cases, the extensible format of a CGA may lower administrative and communicative overhead. The extensible CGAs may effectively remove or reduce the 64-bit limit on the length of a cryptographic hash value. Although extensible CGAs may increase the cost of address generation, extensible CGAs may correspondingly increase the cost of "brute-force" attacks (i.e., exhaustive searches for hash collisions or creation of large pre-computed databases of interface identifiers from an attacker's own public key(s) used to find matches for many addresses). In many cases, extensible CGAs may maintain or slightly increase the cost of address use and verification as compared to prior CGA use and verification. For purposes of brevity, extensible CGAs will hereinafter be referred to as ECGAs.

In one example of generating an ECGA, an address owner computes two hash values using the public key and other parameters. A second hash value sets an input parameter for a first hash value, and at least a portion of the network address is derived from the first hash value. The combination of the two hash values increases the computational complexity of generating new addresses and, consequently, the cost of brute-force attacks. The combination of two hash values allows the address owner to select levels of security above the 64-bit limit of prior CGA-based authentication mechanisms.

As another measure against brute-force attacks, the routing prefix (i.e., the portion which is not selectable by the address owner) of the address may be included in the first hash input. Including the routing prefix in the first hash calculation increases the cost of pre-computation attacks by making some brute-force attacks against global-scope addresses more expensive because the attacker must do a separate brute-force search for each address prefix. Should the address owner move between networks and thereby change the corresponding routing prefix, the second hash value can be reused because it may be independent of the value of the routing prefix. In this manner, a computationally expensive part of address generation may be avoided and/or reduced. Because the high overhead of re-calculating the second hash function may not be necessary when the routing prefix changes, ECGAs may be suitable for mobile communications applications.

The input to either or both of the first and second hash functions may be formatted as defined in IETF Request For Comments 3972 or as another data structure that contains the public key and possibly other parameters. In another example, the input to either or both of the first and second hash functions may be formatted as part of a self-signed certificate. A self-signed certificate is a standard format for storing and transferring public keys in Internet protocols. The signature on the certificate proves that the public-key owner wants to use the ECGA. Additionally, certificates make it easier to use ECGA-based and Public Key Infrastructure (PKI)-based address authentication side by side in the same protocols. Some protocols, however, may need to save octets and transfer only the public key and other parameters, rather than a full self-signed certificate. An optimized parameter format, for example, one similar to the format in RFC 3972, may be defined for this purpose. Moreover, protocols may optimize the transfer of the parameters by avoiding retransmission of parameters already known by the receiver or ones sent in other parts of the protocol.

The address owner may use the ECGA as its own address when sending a message or, if sending the digitally signed message from another address, may indicate that the message is being sent on behalf of the owner of the ECGA. The recipient of the message with the public signature key and other CGA parameters may authenticate the source of the message by performing two hash functions on the public key and other parameters and by verifying the signature on the message.

In an ECGA-based authentication mechanism, the recipient of the message may be either a separate entity or the same entity that created the message. An example of the latter is the message creator storing messages for retrieval at a later time. When the creator of the message retrieves the message, the authentication mechanism assures that the integrity of the message has not been compromised while it has been stored.

In the various examples discussed below, one or more of the various problems described above have been reduced or eliminated, while other examples are directed to other improvements. Many of the features described above and/or other features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an authentication mechanism system, the system described is provided as an example and not a limitation. As those skilled in the art will appreciate, the present examples are suitable for application in a variety of different types of authentication, authorization, and access control systems.

The following description will introduce generation of an extensible CGA (hereinafter ECGA) and how the ECGA may be authenticated by an authentication mechanism. Implementation options will then be discussed and how the authentication mechanism may operate in other cases. Features of ECGAs may be used to provide a simple, lightweight, and/or deployable authentication mechanism, such as to authenticate a message or other information. For example, the authentication mechanism may determine whether the information can be trusted to be from the sender address or other entity it purports to be from. All or a portion of the authentication mechanism may be applied to any type of message or information to enhance security and/or authentication.

Figure 1:
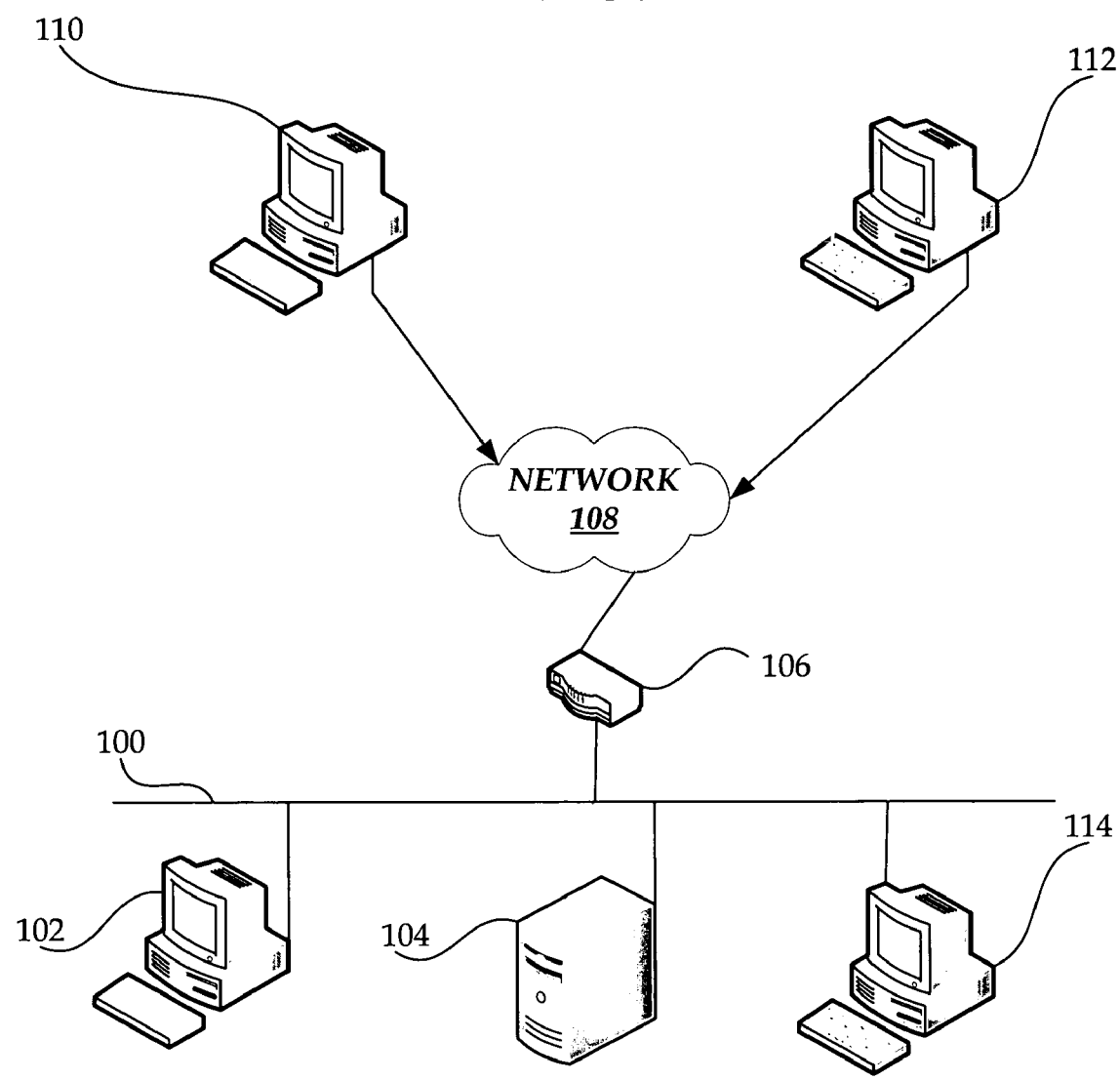
FIG. 1 is a schematic diagram showing an example communications network in which an authentication mechanism can be practiced.

An authentication mechanism may be deployable within a network environment, such as the example network of FIG. 1. As shown in FIG. 1, a computing device 102 on a local area network (LAN) 100 may be accompanied by a server 104 and/or a router 106. The router allows the devices on the LAN to communicate over an internetwork 108 to remote computing devices such as device 110. The Internet is one example of an internetwork. Any of the devices, including the router, in FIG. 1 may send a message to any other device. In protocols typically used today, the message contains the network address of the sender (the "FROM address") and the network address of the recipient ("the TO address").

Consider, as a first example, that device 102 is operated by a systems administrator authorized to reconfigure the router 106. For security's sake, the router does not accept commands from devices other than device 102. But when the router receives a reconfiguration command message with a FROM address set to the address of device 102, the router believes the message is authentic and carries out the command. (This example is for illustrative purposes only: Router communications are generally much more secure than is depicted here.) However, it is very easy to create and send a message with a deceptive FROM address. For example, device 112 could create a router reconfiguration command message and put device 102's network address in the FROM address field. Without a mechanism for authenticating a message, the router cannot know which device actually sent the message. The router does not know that the message is not authentic and carries out the command, possibly compromising the security of all of the devices on the LAN. As a second example, device 102 uses a "Neighbor Discovery" protocol to resolve the network address of a router to a link-layer address (i.e., MAC address) and then uses the router when communicating with remote devices such as device 110. Without an authentication mechanism in place, device 114 may impersonate router 106. Messages from device 102 intended for device 110 would then go to device 114 which may read the contents of the messages, discard the messages (thus launching a denial-of-service attack against device 102), and/or alter the messages before sending them on to device 110. As a third example, device 114 may interfere with the process in which device 102 obtains a network address. For example, if device 102 executes a "Duplicate Address Detection" protocol to check that no other network node is using the same address as device 102, device 114 may generate messages that make it appear as if all addresses were already in use (i.e., owned) by some other network node. This way, device 114 can prevent device 102 from obtaining an address on the network. These are just three examples illustrating the ubiquitous need for authentication. The examples are extendable to any sort of message sent to any sort of device using any sort of communications method or protocol.

To fend off attacks such as those described in the first two examples of the previous paragraph, a recipient of a message may authenticate the sender of the message, that is, determine if the message was actually sent by the sender indicated in the message. When the recipient is able to reliably determine the true sender of a message, then the recipient can choose to act on the message only if it is sent by an appropriate or trusted device. To fend off attacks of the sort described in the third example of the previous paragraph, a network node needs a method of generating a new network address and for proving that it has, with high probability, generated the address itself. Such a method prevents malicious network nodes from falsely claiming ownership of the new address with a significant success rate.

In the description that follows, the authentication mechanism is described with reference to acts and symbolic representations of operations that are performed by one or more computers, unless indicated otherwise. As such, it will be understood that such acts and operations, which are at times referred to as being computer-executed, include the manipulation by the processing unit of a computing device of electrical signals representing data in a structured form. This manipulation transforms the data or maintains the data at locations in the memory system of the computing device, which reconfigures or otherwise alters the operation of the computer in a manner well understood by those skilled in the art. The data structures where data are maintained are physical locations of the memory that have particular properties defined by the format of the data. However, while the authentication mechanism is being described in the foregoing context, it is not meant to be limiting as those of skill in the art will appreciate that various of the acts and operations described hereinafter may also be implemented in hardware.

Figure 2:
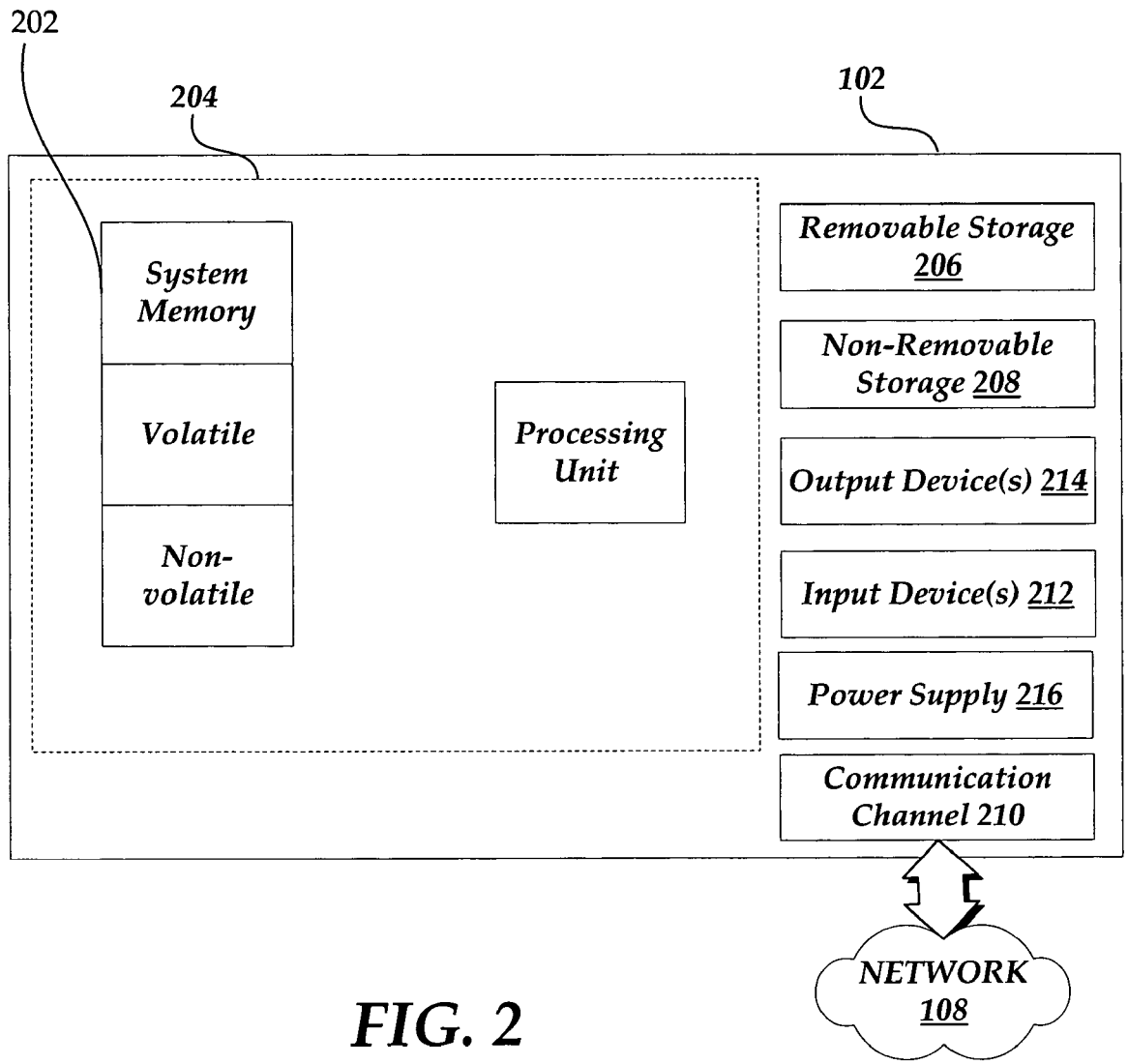
FIG. 2 is a schematic diagram showing an example computer device on which at least apportion of which the authentication mechanisms may be implemented.

Referring to FIG. 2, the authentication mechanism may be implemented in communications between network nodes on connected computer networks. Each of the network nodes resides in a computing device that may have one of many different computer architectures. For descriptive purposes, FIG. 2 shows a schematic diagram of an example computing device architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 2. The authentication mechanism is operational with numerous other general-purpose or special-purpose computing or communications environments or configurations. Examples of well known computing systems, environments, and configurations suitable for use with the invention include, but are not limited to, mobile telephones, pocket computers, personal computers, laptop devices, handheld devices, set top boxes, servers, routers, network address translators, switches, wireless access points, multiprocessor systems, microprocessor-based systems, minicomputers, mainframe computers, and distributed computing environments that include any of the above systems or devices.

In a basic configuration as shown in FIG. 2, a computing device 102 typically includes at least one processing unit 200 and memory 202. The memory 202 may be volatile (such as RAM), non-volatile (such as ROM, flash memory, etc.), or some combination of the two. The basic configuration is illustrated in FIG. 2 by the dashed line 204.

The storage media devices may have additional features and/or functionality. For example, the storage media devices may include additional storage (removable and non-removable) including, but not limited to, PCMCIA cards, magnetic and optical disks, magnetic tape, external hard drives, and any other suitable removable or non-removable storage. Such additional storage is illustrated in FIG. 2 by removable storage 206 and non-removable storage 208.

Computer-storage media include volatile and non-volatile, removable and non-removable media implemented in any method or technology for storage of information such as computer-readable instructions, data structures, program modules, or other data. Memory 202, removable storage 206, and non-removable storage 208 are all examples of computer-storage media. Computer-storage media include, but are not limited to, HDD, RAM, ROM, EEPROM, flash memory, other memory technology, CD-ROM, zip drives, digital versatile disks, other optical storage, magnetic cassettes, magnetic tape, magnetic disk storage, other magnetic storage devices, and any other media that can be used to store the desired information and that can be accessed by the computing device.

Computing device 102 may also contain communication channel 210 that allow the host to communicate with other devices. Communication channel 210 may include one or more communication channels and is an example of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media includes wired media, such as wired networks and direct-wired connections, and wireless media such as acoustic, radio, infrared, and other wireless media. The term computer-readable media as used herein include both storage media and communications media.

The computing device 102 may also have input components 212 such as a keyboard, mouse, pen, a voice-input component, a touch-input device, etc. Output components 214 include screen displays, speakers, printer, etc., and rendering modules (often called "adapters") for driving them. The computing device 102 has a power supply 216.

Extensible Cryptographically Generated Addresses

A device, such as the computing device 102, may write a message in a way that the message could only have been written by this particular device, e.g., the message may be authenticated as coming from the sending computing device such as by using an authentication mechanism. The authentication mechanism may be unilateral in that the recipient does not need to have further communications with the sender for completing the authentication process. For example, the message may contain everything the message recipient, such as the router 106 of FIG. 1, needs to decode the message and to determine that it must have come from a particular device such as the computing device 102.

The authentication mechanism may be based on public key cryptography used in combination with the selection of a network address of the message sender. The selected network address may include an extensible Cryptographically Generated Address (ECGA) which is based on the public key and other parameters. In the example of FIG. 1, the ECGA address is an address of the computing device 102. One way this address may be derived from the public key of the device 102 is described in connection with FIGS. 3, 4, and 5.

Figure 3:
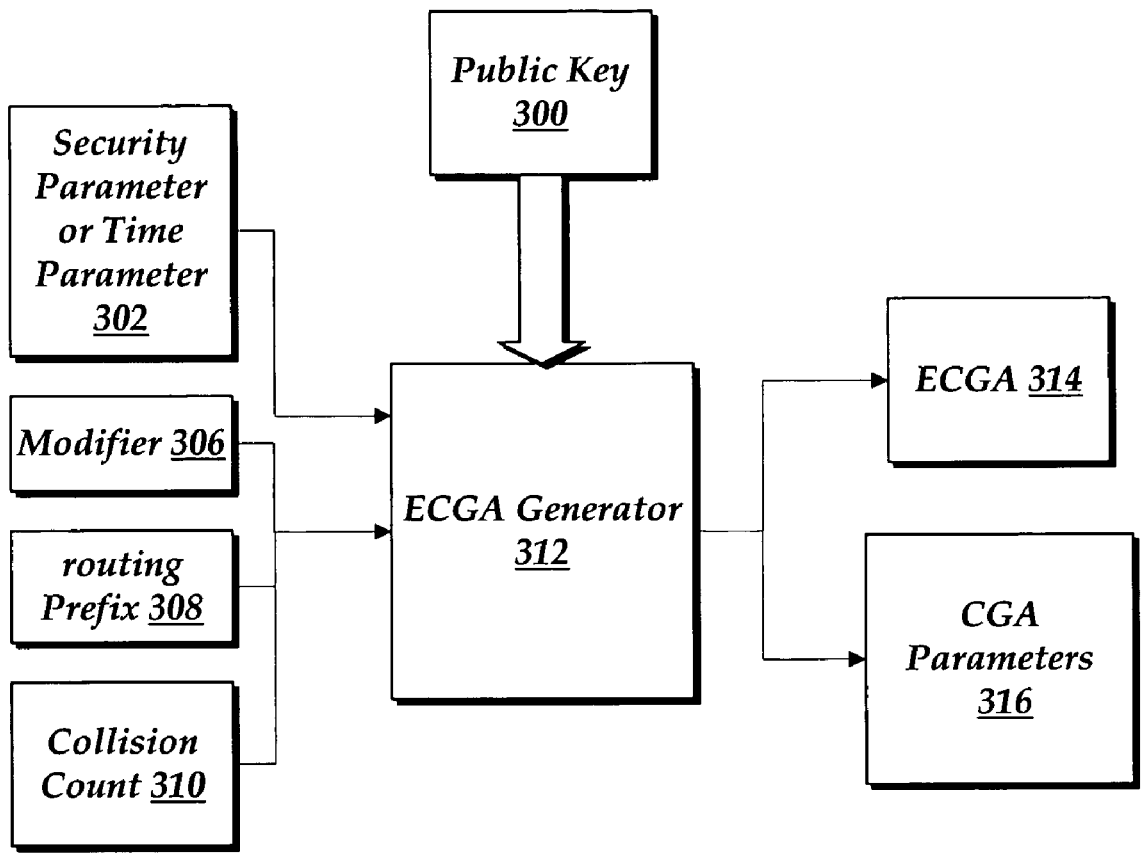
FIG. 3 is a schematic diagram showing example inputs and example outputs of example address generation procedure.

The ECGA may be generated in any suitable manner, such as by an ECGA generator 312 shown in FIG. 3. An ECGA generator 312, which may be implemented in the computing device 102 of FIG. 1, may take one or more inputs (or any combination thereof) which may include one or more of the public key 300 of the address owner, the routing prefix 308 of the network of the address owner, a collision count 310 data value (which may be initially set to zero), a modifier 306 data value, a security parameter (Sec) 302, a time parameter, and the like. The modifier 306 may be any suitable modifier, which in one example may be a random 16-octet string. The security parameter 302 may be any suitable security input, which may be an unsigned 3-bit integer having a value between 0 and 7. The value of the security parameter 302 may be selected by the sending device (address owner), such as by computing device 102. The time parameter may define the time to compute a second hash value in generating the ECGA. The ECGA generator 312 outputs a new ECGA address 314. The output ECGA address may be in accordance with any appropriate protocol, including without limitation Internet Protocol version 6 (IPv6), a link-layer address (MAC address), and the like. The ECGA generator may output associated CGA parameters 316, and an optional self-signed certificate.

Figure 5:
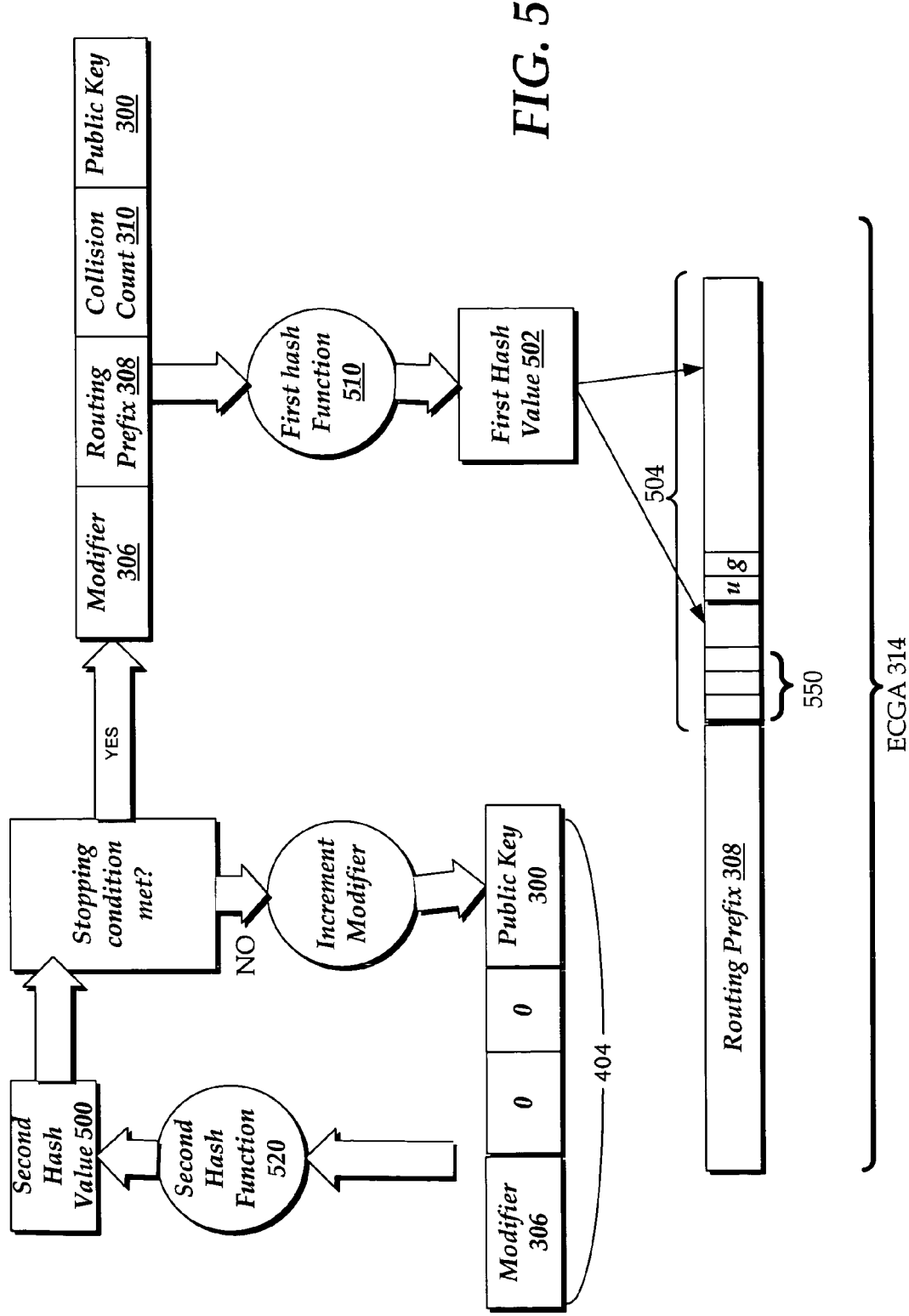
FIG. 5 is a schematic diagram showing an example derivation of an extensible cryptographically generated address from a public key of the sending device and other parameters.

In one example, the output ECGA may be in accordance with the IPv6 protocol. As shown in FIG. 5, an IPv6 address 314 is 128 bits long. It is generally divided into two parts. The leftmost 64 bits are the routing prefix 308, which are used for routing Internet Protocol (IP) packets across the Internet to the destination network. The rightmost 64 bits are the interface identifier 504, which identifies an individual node within a local network. The interface identifier 504 part of the address is referred to as the "node-selectable" portion because the sending device 102 is free to set this part as it sees fit. The interface identifiers may be chosen in any suitable way, e.g., randomly, as long as no two nodes on the same network share the same value, assigned by a local administrator, and the like. While the division of the 128-bit IPv6 address 314 into two 64-bit parts is typical, the division can be done in some other proportion. For example, the length of the interface identifier 504 may be increased at the expense of decreasing the length of the routing prefix 308, or some parts of the interface identifier may be determined by a routing protocol making them effectively a part of the address prefix.

The network address of the sending node may be identified as an ECGA in any suitable manner, including without limitation one or more of a preset portion of the routing prefix, a preset portion of the interface identifier, a header or message content in the message, and the like. For example, the network address itself may identify the address as an ECGA. In one example, the interface identifier 504 may include two bits which may be set to indicate that the network address is an ECGA. In IPv6 addresses, the 7th bit from the left in the 64 bit interface identifier 504 is the Universal/Local bit or "u" bit. It is usually set to 1 to mean that the interface identifier 504 is configured from an EUI-64 identifier from the interface hardware and, thus is globally unique. The 8th bit from the left is the Individual/Group or "g" bit, which is usually set to 1 for multicast addresses. The bit combination u=1, g=1 is currently unused because a multicast address (as indicated by g=1) cannot be globally unique (as indicated by u=1). In this manner, the bit combination of u=1, g=1 may be allocated for indicating ECGA addresses. Allocating one or more bits of the network address, such and the u and/or g bits of an IPv6 address may facilitate mixed use of cryptographically generated and non-cryptographically generated addresses in any security protocol without weakening the security of either address type. However, it is to be appreciated that ECGA addresses and authentication may be used even if such allocation is not made.

The routing prefix or the interface identifier portion of the ECGA may include a hash indicator indicating the type or length (or both) of the hash value used in generating the ECGA. In one example, the hash indicator includes the security parameter (Sec) 302, which may indicate the level of security. If a time parameter is used to determine the security level when generating the address, the determined security level may be indicated by the security parameter or hash indicator exactly in the same way as if no time parameter were used. That is, the mechanism for determining the security level may be independent of the mechanism for communicating the security level in the address. However, it is to be appreciated that any suitable hash indicator may be used to indicate the selected second hash value or a set of possible hash values.

If the hash indicator value is encoded into the address bits, an attacker may not be able to change the value of the security parameters or other inputs to the first and/or second hash values without also changing the address. In one example, the hash indicator is an unsigned integer. Although any suitable bit length may be selected for the hash indicator, FIG. 5 illustrates one example length of the security parameter as 3 bits. The hash indicator 550 may be in any suitable portion of the interface identifier 504. For example, as shown in FIG. 5, the hash indicator may be encoded in the leftmost bit position(s) of the interface identifier or node selectable portion of the ECGA. The hash indicator may allow the address owner to increase the computational cost of address generation and, thus to also correspondingly increase the cost of brute-force attacks against the address. Thus, in some cases, as described further below, incrementing Sec 302 by one may add 16 bits to the length of the hash that the attacker must break.

To generate an ECGA, the network address, such as an IPv6 address, may include a hash value based on public key information. However, the node selectable portion of the network address in IPv6 is typically 64 bits. In some special protocols, the node selectable portion may be longer at the at the expense of decreasing the length of the routing prefix. In other protocols, such as NAT and firewall traversal protocols, the node selectable portion may be shorter, such as 48 bits, because the routing prefix is longer or some bits of the interface identifier are determined by the protocol. In this manner, the length of a hash output is limited to approximately 64 bits and sometimes to as little as 48 bits in IPv6. However, in some cases, approximately 48 or 64 bits may not provide sufficient security and/or may not contain a sufficiently strong cryptographic hash value.

The ECGA includes a hash of the public key as a portion of the network address. As shown in FIG. 5, at least a portion of the interface identifier 504 may include at least a portion of a hash of the public key 300. The hash of the public key may be generated by any suitable first hash function 510, including without limitation MD5, SHA-1, N-hash, and the like.

Figure 11:
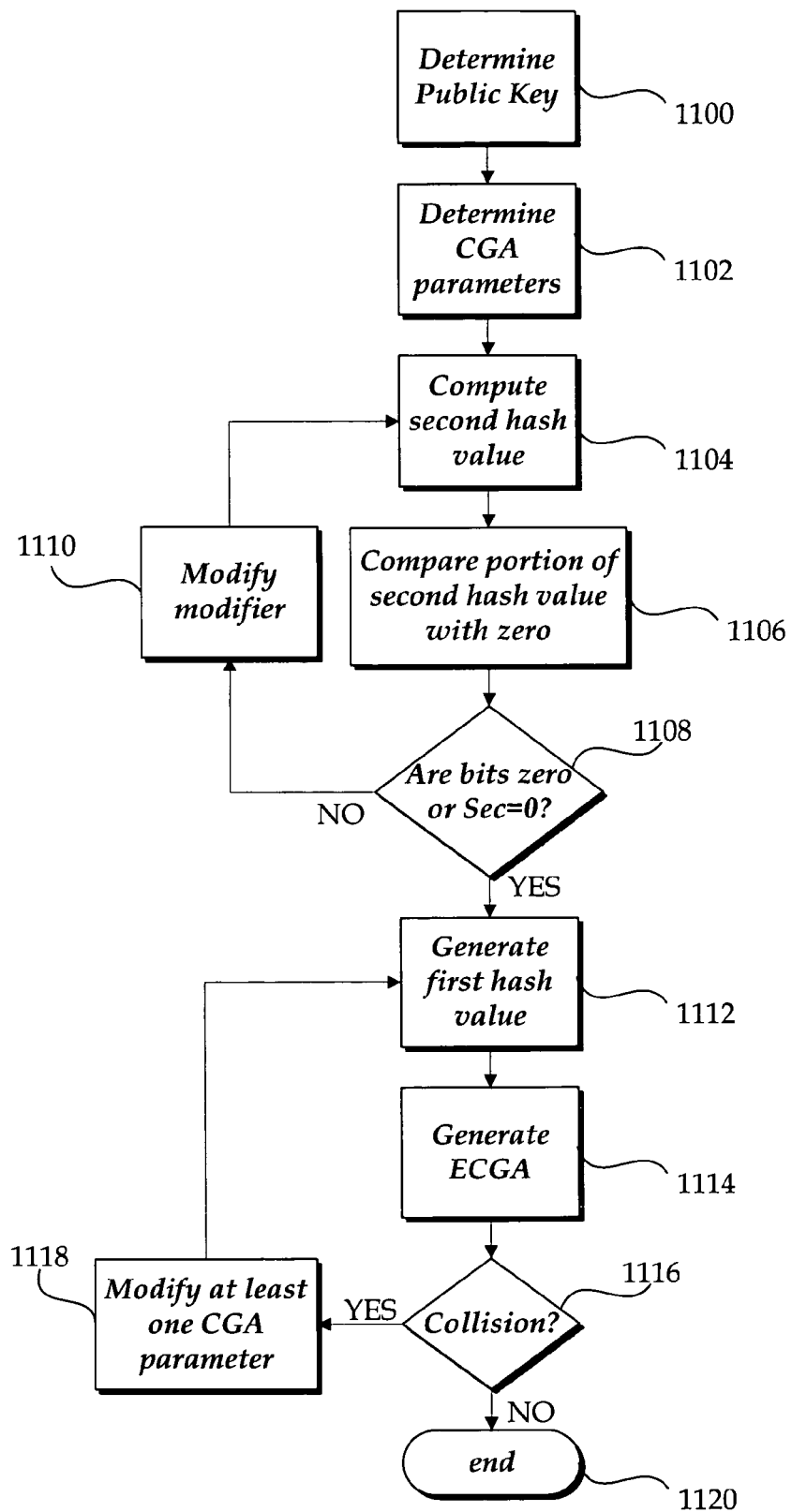
FIG. 11 is a flowchart of an example procedure for creating an extensible cryptographically generated address by the sending device.

With reference to the flowchart of FIG. 11, generating an ECGA may begin with determining 1100 the address owner's public key. The address owner's public key may be determined in any suitable manner. For example, the public key may be determined by the ECGA generator such as by retrieving the public key from memory of the address owner's computing device, retrieving the public key from a certification authority, and the like. Determining the public key may include transforming or encoding the public key into a format usable by the ECGA generator. For example, as shown in operation 400 of FIG. 4, the public key of the address owner may be DER-encoded as an ASN.1 structure, which may have a type such as SubjectPublicKeyInfo.

The ECGA parameters may be determined 1102. For example, as shown in operation 402 of the example flowchart of FIG. 4, the modifier data value (e.g., modifier 306 of FIG. 3) may be initialized as 16 random octets or any other appropriate modifier value. The routing prefix (e.g., routing prefix 308 of FIG. 3) may be set to the routing prefix value advertised by the router at the address owner's local subnet. The collision count (e.g., collision count 310 of FIG. 3) may be initialized to zero. The public key may be set to the DER-encoded public key of the address owner. The determination of the ECGA parameters may include transforming or encoding the ECGA parameter values into a format usable by the ECGA generator. For example as shown in operation 404 of FIG. 4, each ECGA parameter may be concatenated to form a CGA Parameters data structure as defined in IETF RFC 3972, which is incorporated herein by reference. In another example, the CGA parameters may be DER encoded as an ASN.1 structure.

The second hash value may be computed 1104. Although called the "second" hash value herein, it is actually the first hash value calculated in time. The second hash value may be a hash of a combination of the public key 300 and the one or more of the CGA parameters determined in operation 1102. For example, the second hash value may be a hash of a combination of the modifier 306 and the public key 300 of FIG. 3. For example, the modifier 306 and public key 300 may be concatenated 404 with zero-valued routing prefix and collision count to form a CGA Parameters data structure as defined in IETF RFC 3972 as shown in FIG. 5 and the method of FIG. 4. The concatenation may be hashed by a second hash function 520 shown in FIG. 5 to provide a second hash value 500 shown in FIG. 5. The second hash function may be any suitable hash function, such as the SHA-1 algorithm, and may be the same as or different from the first hash function 510.

The authentication mechanism may use the SHA-1 hash function for the implementation of both the first and second hash functions. The output of the hash function may be longer than is required by the algorithm, such as the 160-bits output of SHA-1. In that case, the hash value may be truncated to the appropriate length, for example, by taking the required number of leftmost bits of the hash function output. The SHA-1 algorithm is a one-way hash function, meaning that it takes a message and converts it into a fixed-length string of digits, also called a message digest. The speed of the hash function may not be important with respect to the address generation process. The purpose of the second hash function is to set the value of at least one input parameter for the first hash function (such as the modifier), and it is the combination of the two hash values that increases the computational complexity of generating new addresses. Since the second hash function exponentially increases the cost of hashing, the small speed differences between SHA-1 and other hash functions may be irrelevant in the present invention. While SHA-1 is used here as an example of a hash function, any other cryptographic function with the second-preimage-resistance property may be used instead.

Figure 4:
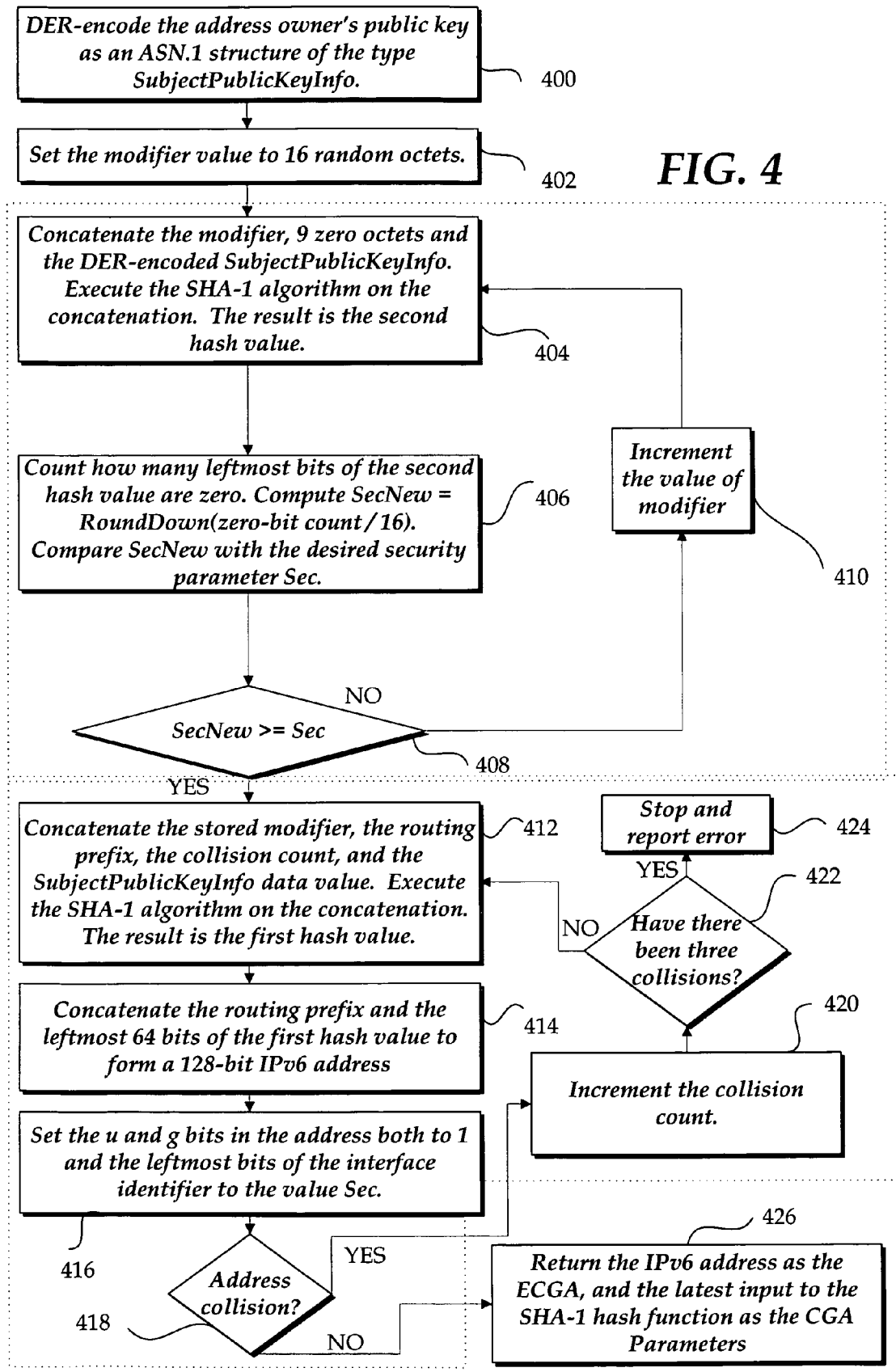
FIG. 4 is a flowchart of an example procedure for creating an extensible cryptographically generated address by the sending device.

In one example, the result of the second hash function may be the second hash value 500 in FIG. 5. The bits of a portion of the second hash value may be compared 1106 to zero, as shown in FIG. 11. For example, as shown in FIG. 4, the N*Sec leftmost bits of the second hash value 500 may be compared with zero (406 and 408 in FIG. 4). For example, a second hash value of 00001ccd45bfe68e38b8d47bab2cd070781d765f has a count value of 19 left-most 0 bits. If N=16, this corresponds to Sec=1 and N*Sec=16. The modifier and the determined count value may be stored in any suitable manner, such as in a data store.

The value N may be any suitable value which may depend on the protocol for which the ECGA is used. As shown in step 406 of FIG. 4, the value of N may be 16, however, it is to be appreciated that any suitable value for N may be used such as 4, 8, 12, and the like. If the N*Sec leftmost bits are all zero, or if Sec=0, (step 408 and 1108), the process continues with the step 412, 1112 of FIGS. 4 and 11 respectively. Otherwise, the value of the modifier 306 (or other CGA parameter that is an input to both the first and second hash values) is modified 1110 in any suitable manner, as shown in FIG. 11. For example, another random number may be chosen for the modifier. In another example, as shown in FIG. 4, the modifier may be incremented in step 410. The process of computing the second hash value continues again with step 404, 1104 of FIGS. 4 and 11 respectively, of determining the second hash value using the newly modified modifier and the public key.

The initial value of the CGA parameters such as the modifier 306 in step 402, 1102 and the method of modifying the modifier in step 410, 1110 can be chosen arbitrarily. In order to avoid repeatedly trying the same value for modifier 306, the initial value may be chosen randomly. The quality of the random number generator may not be important as long as the same values are not repeated frequently. One way to modify modifier 306 is to increment the content octets as if they were a 128-bit integer (with any byte order) 410.

For values of the security parameter (Sec) 302 greater than zero, this process is not guaranteed to terminate after a certain number of iterations. The brute-force search in steps 404-410 takes, on the average, approximately $2^{16*Sec}$ iterations to complete (the median number of iterations is $0.69*2^{16*Sec}$).

The value of Sec may be difficult to determine. For example, the greater the value of Sec, the greater the processing cost may be to generate the ECGA. However, if Sec is static, increases in computational speed in the marketplace may reduce the security of the resulting ECGA over a period of time. For example, if the cost of computing power halves every 18 months, the number of zero bits (N*Sec) required in the second hash value should be incremented by 1 every 18 months to maintain the same level of security against brute force attacks. However, the prediction of computing power over the next 5-50 years may be difficult. Moreover, asking the user or administrator to increase the value of N*Sec may be impossible or impracticable if the ECGA is generated automatically at the time the operating system installation or bootstrapping. Moreover, a predetermined value of N*Sec may be too small, which may cause the security of the generated ECGA to be less than desired. Conversely, a predetermined value of N*Sec may be too large, which may cause unacceptable delays in address generation.

A future cost of brute force attacks may be implied by the cost of generating the ECGA, e.g., the computing power of the computing system generating the ECGA. For example, the input N*Sec (e.g., Sec 302 of FIG. 3) may be replaced by a time input parameter indicating a time to be used for the address generation. In this manner, the generation of the second hash value may be based on the speed of the computing device generating the second hash value. The time input parameter may be set or initialized (such as in step 1102) by any suitable party, such as a device manufacturer or operating system vendor or by the user and may be set to the time that the user may be willing to spend on ECGA generation. For example, the time input may be set within a range of approximately 1-60 seconds if the user is waiting for the computations to approximately 1 CPU day or more if the computation is done slowly in the background. If the ECGA generation is done by a fast computer or dedicated machine other than the device for which the address in intended, the computation time may be set depending on the capacity of the machine used for the ECGA generation. More particularly, rather than having an input N*Sec 302 based on a number referring to a number of bits, the time parameter which is input to the ECGA generator 312 may refer to the time to compute the second hash value 500 of FIG. 5. The time parameter may be in any suitable form and/or units, such as an integer or real number value in seconds, CPU cycles, and the like. The ECGA generator may compute multiple second hash values during a time period defined by the time parameter input, and the output second hash value 500 may be selected as the 'most secure' hash value generated in that time. The most secure hash value may be determined in any suitable manner, such as by the generated hash value in the input time which has the greatest number of zero bits. If the number of zero bits is expressed as N*Sec, where Sec is a security parameter encoded in some bits of the address, the most secure hash value may be determined by selecting the hash value that has the greatest number of zero bits rounded down to the nearest integer multiple of N. The greatest number of zero bits may be in a predetermined portion of the hash value (such as a predetermined number of the left-most bits), may be the greatest number of zero bits within the complete computed hash value, may be the greatest number of sequential zero bits within the computed hash value, the greatest hash extension, and the like.

Figure 12:
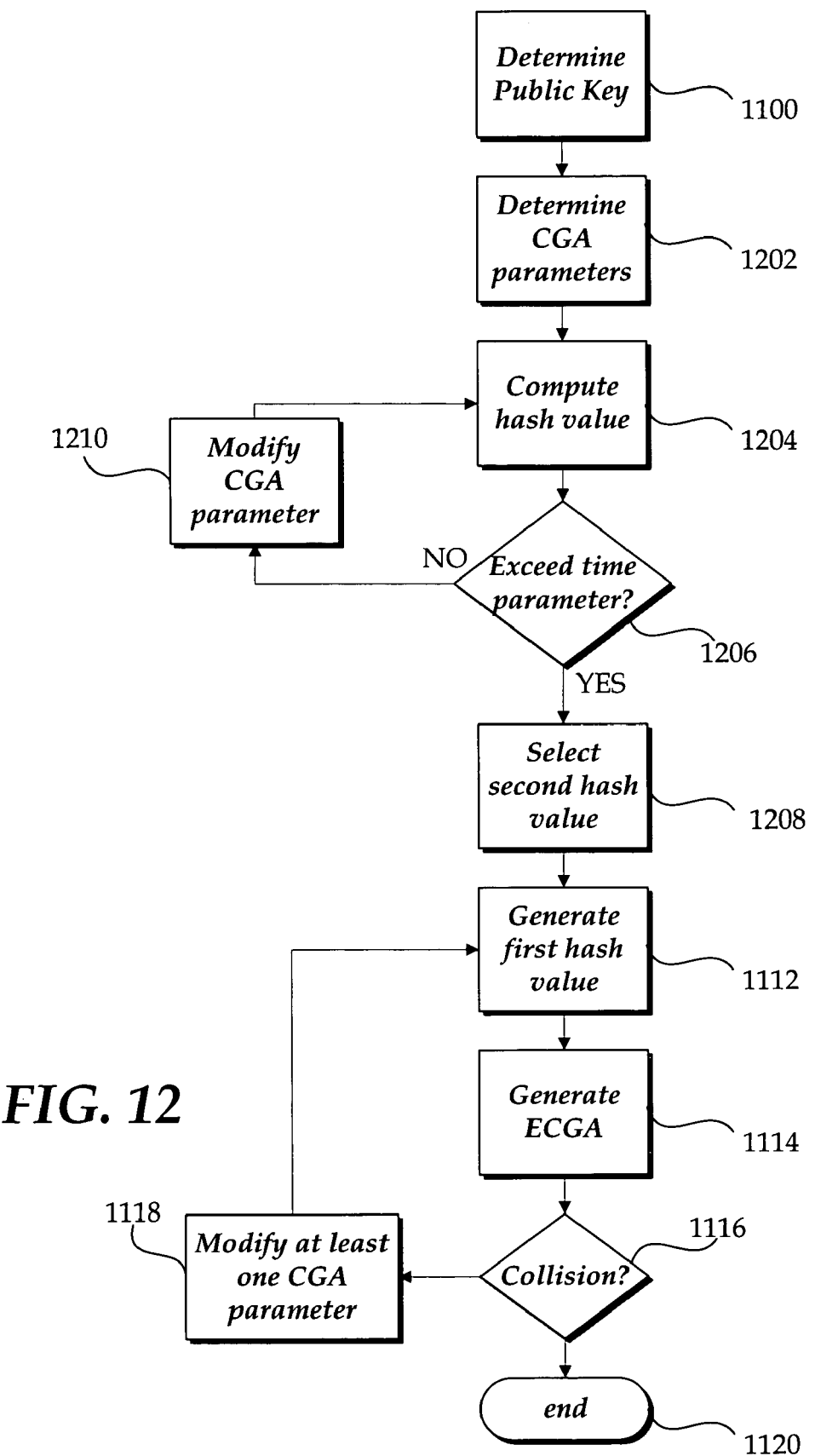
FIG. 12 is a flowchart of an example procedure for creating an extensible cryptographically generated address by the sending device.

FIG. 12 illustrates an alternative method of generating an ECGA based on time rather than a security parameter. With reference to FIG. 12, the public key may be determined 1100, similar to the public key determination of FIG. 11. The determination 1202 of the CGA parameters may include initializing the time parameter to a time allowed to compute the second hash value. A hash value of the combination of the public key and one or more CGA parameters, such as the modifier, may be computed 1204, such as by the ECGA generator. The method may check 1206 if the time specified by the time parameter has been exceeded. The ECGA generator may determine if the time parameter has been exceeded in any suitable manner such as by comparing the time parameter to a clock noting elapsed time, a number of computer cycles spent in computing the one or more hash values, and the like. Alternatively, the termination condition 1206 for the hash computation may be implemented by an external interrupt received from a hardware timer or by a signal received from another thread of software on the same machine. If the time parameter has not been exceeded, one or more CGA parameters used as input to the second hash value, such as the modifier, may be modified 1210. For example, the modifier may be modified in any suitable manner as described above, such as selecting another random octet, incrementing a previous value of the modifier, and the like. The modified parameter(s) may be combined with the public key to compute 1204 the next iteration of a hash value.

If the time parameter has been exceeded in the hash value generation, the second hash value may be selected 1208 from the one or more generated hash values computed by step 1204. In one example, one or more of the most secure generated hash values may be stored in a hash value data store. Each hash value may be stored associated with the CGA parameter(s) used to compute the hash value. The second hash value may be selected in any suitable manner, such as by selecting the 'most secure' hash value generated in the time period specified by the time parameter. For example, after each hash value is generated 1206, the number of zero bits may be counted in the selected portion and compared to the number of count of zero bits of a previous computed hash value. The CGA parameters used to compute the hash value with the greatest number of zero bits in the selected portion may be stored. In this manner, the stored CGA parameters at the end of the time defined by the time parameter may be selected for input to the first hash function 1112. The stored and selected values may be stored in any suitable manner, such as in a data store, and may be associated with one or more other values, which may be stored in a data matrix of the data store.

Figure 13:
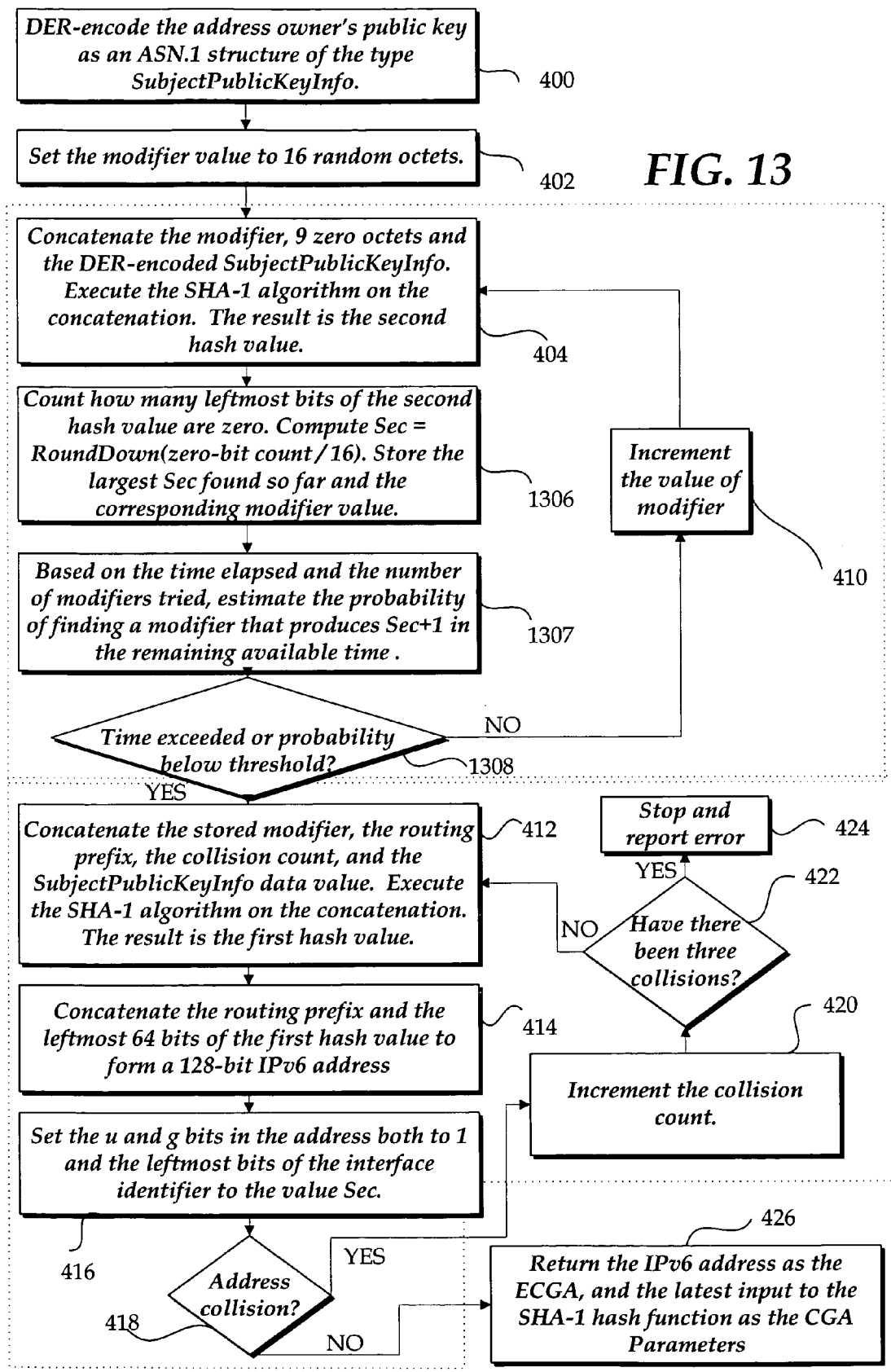
FIG. 13 illustrates a flowchart of an example procedure for generating an extensible cryptographically generated address by the sending device.

The flowchart in FIG. 13 shows an example of how the process of FIG. 12 may be implemented in the particular case of the ECGA format defined in RFC 3972. Compared to the flowchart of FIG. 5 where the security parameter Sec value is an input to the ECGA generation process is, the Sec value in FIG. 13 is an output of the computation, and a time parameter is received as input. The generation will end if the time parameter is exceeded 1308. During the brute-force search loop (steps 404, 1306, 1308, and 410), the hash value that matches the highest found Sec value is stored 1306. After the time parameter is exceeded and the loop terminates, the modifier value that produced the highest found Sec value will be used for the remainder of the address generation.

The time parameter limits the maximum time that the CGA generation may take. The address generator may further reduce the average time consumed by the address generation by stopping the search for new modifiers if it is unlikely that a stronger address than has already been found would be found in the remaining time. That is, if a second hash value corresponding to security parameter Sec (i.e., N*Sec zero bits in the second hash value) has been found, the generator may calculate the probability of finding a second hash value with the next higher security parameter Sec+1 in the remaining time within the limits of the time parameter. This probability may be compared with a predetermined threshold, such as 1%, 50% or 99%. If the probability is below the threshold, the generator may stop trying further modifier values and use the most secure hash value and modifier found so far (i.e., one with security parameter Sec). When N=8 or N=16, a CGA parameters value (such as a modifier value) that produces a reasonably secure Sec value may be found early in the process and continuing the brute-force search loop until the time parameter is exceeded is very unlikely to find a CGA parameters value (such as a modifier value) that produces an even higher Sec value. Therefore, the early stopping has the potential of significantly reducing the average time spent on ECGA generation.

The early stopping condition may be evaluated 1307 as a part of the brute-force search loop in FIG. 13. In that case, the termination condition 1308 for the loop may be triggered not only when the time parameter is exceeded but also when the early stopping condition holds, as shown in FIG. 13. The differences between FIG. 5 and FIG. 13 illustrate the differences between the ECGA generation algorithm (such as defined in IETF RFC 3972) and the present example when the time parameter implementation is applied to the standard CGA addresses of RFC 3972.

Given a threshold probability p for finding more secure CGA parameter values, maximum time for address generation MaxTime, and the already elapsed time t, the number of modifier values tried so far n, and largest already found security parameter Sec, the early stopping condition may be computed in the logarithmic scale (i.e., in terms of bit counts). For example, the generator may terminate the brute-force search if t>MaxTime, or if t>MinTime and N*(Sec+1)>log 2((Max−t)*n/t)−log 2(ln(1/(1−p))). MinTime is a minimum time for which the computation should take. The appropriate minimum time depends on the amount of variation in the CPU power available to the computation and should be set to be large enough to prevent random variations in the computation speed to have an effect on the stopping condition. Alternatively, the rate at which hashes are computed (n/t) may be estimated by other means, such as by measuring the performance of the CPU(s) prior to the ECGA generation.

For a given probability threshold p, the termination condition may be approximated by computing the numeric value of the last term and by rounding the terms up or down to the nearest integer (i.e. to full bits). For example, if N=16 and p=99%, the above stopping condition can be approximated as: t>Max or (t>Min and 16*(Sec+1)>RoundDown(log 2((Max−t)*n/t))+7).

The early stopping condition may increase the probability that the search for Sec+1 will continue only if there is a high probability of finding a match in the remaining time. The 16- or 8-bit increments in hash length (N=16 or N=8) are relatively large steps. Therefore, the generator often stops early because it has found a match for one level of security (Sec) and has little change of reaching the next level (Sec+1). In the majority of cases, this will cause the address generation to terminate much before the allocated time. On some machines, however, the address generation will take the full allocated time MaxTime.

Once the second hash value has been generated (as illustrated in either FIG. 11 through a security parameter and FIG. 12 through a time parameter), the extensible cryptographic address generation can be generated by determining 1112 the first hash value. Any suitable process may be used to determine the first hash value based on the second hash value.

For example, steps 412 through 424 of FIG. 4 or FIG. 13 may be used to determine the first hash value using the first hash function. For example, the public key may be concatenated with one or more CGA parameters (as shown in FIG. 4 and FIG. 5), such as a composite of one or more data fields, including any one or more of CGA parameters (such as the modifier 306) used to generate the second hash value, the routing prefix 308, and/or the collision count 310). The modifier value 306 is set in the preceding steps of the second hash computation, and may be retrieved from a suitable data store. The collision count 310 is initially set to zero and may be incremented when an address collision occurs, as explained further below. The routing prefix 308 may be obtained by the address creator in any suitable manner such as from the network 100. For example, the routing prefix may be determined by listening on the node's network link for advertisements from the local router 106. For details on how this works on an IPv6 network, see the IETF RFC 2462 "IPv6 Stateless Address Autoconfiguration" and IETF RFC 3971 "Secure Neighbor Discovery (SEND)," which are herein incorporated in their entirety for everything they describe.

The combined public key and CGA parameter(s) may be hashed, such as by the first hash function which may include the SHA-1 algorithm (step 412 if FIG. 4). The result is the first hash value 502 shown in FIG. 5.

It is to be appreciated that the routing prefix 308 is not an essential input to the first hash function of the above step. The omission of the routing prefix 308 from the input to the first hash function could result in the first and second hash values being identical if all parts of the first and second hash inputs are identical. One solution to prevent two identical hash results is to use a different hash function for the first and second hash functions. Additionally or alternatively, two completely different hash values may be instantiated from the SHA-1 algorithm by appending a predetermined and static second modifier (e.g., a byte with the value one or zero) to the inputs of the first and/or second hash value computation. As another example, the two hash values may be computed by dividing a longer hash value, such as a 160-bit SHA-1 hash, into two parts. In this manner, one portion of the hash value may be used as the first hash value, and a second portion of the hash value may be used as the second hash value.

As shown in FIGS. 11 and 12, the ECGA may be generated 1114 based on at least a portion of the computed first hash value. For example, at least a portion of the first hash value may be used as at least a portion of the interface identifier (or other portion) of the ECGA. In one example, as shown in FIG. 4 and FIG. 13, the 64-bit routing prefix 308 and the leftmost 64 bits of the first hash value 502 may be concatenated 414 to form a 128-bit IPv6 address 314. It is to be appreciated that other protocols may require or allow that the routing prefix and/or interface identifier portions may be selected as other bit lengths as appropriate.

In step 416 and as illustrated in the schematic diagram of FIG. 5, the address may be modified to indicate that the address is an ECGA. For example, as noted above, the "u" and "g" bits in the address (i.e., the user interface portion formed by the first hash value) may be both set to 1, which may identify the address as an ECGA. In one example, the address may be modified to include the hash indicator. For example, where a security parameter Sec is used (as described above with reference to FIG. 11), the security parameter or count value may be included in at least a portion of the ECGA, such as the interface identifier. In one example, the three leftmost bits of the interface identifier may be set to the value for Sec. In this manner, the first three bits of the first hash value may be replaced by the security value or the portion of the first hash value inserted into the interface identifier portion of the ECGA may be shifted over to make room for insertion of the security value in the ECGA. If the time parameter is used to generate the ECGA, the value of Sec or other hash indicator is determined by the allowed computation time and speed of the CPU(s) used for the ECGA generation. After the Sec value (or other hash indicator value) is determined, the value may be treated exactly as if it had been received as input to the ECGA generation. That is, the time parameter need not be encoded into the address bits or communicated when the address is used. Instead, the selected Sec value or other hash indicator is encoded into the address or communicated by other means. The hash indicator may be encoded into any portion of the interface identifier, such as the three leftmost bits of the interface identifier or the node selectable portion of the ECGA. It is to be appreciated that the u bit, the g bit, the hash indicator, and the like encoded into the interface identifier of the ECGA may replace those bits in those locations of the first hash value, or alternatively may be placed in the ECGA and the first hash value located around the encoded parameters. Rather than encoding the ECGA indicator (e.g., u and g bits), the hash indicator and the like into the ECGA address, one or more of the indicators may be sent in protocol messages, implied by the protocol specification, implied by the context of the communication, sent in a certificate, sent in the CGA Parameters data structure defined in IETF RFC 3972 discussed further below, and the like.

The computing device 102 may check whether the address 314 in step 1116 of FIGS. 11 and 12 (also shown as step 418 in FIG. 4) is already in use by another node in the network, i.e., is there an address collision. For example, the computing device 102 may check whether there is an address conflict with respect to the generated ECGA 314. An address collision may be detected in any suitable manner. For example, different protocols may provide different ways of determining collisions. In the Dynamic Host Configuration Protocol (DHCP), which is a protocol for assigning dynamic IP addresses to devices on a network, the server 104 keeps track of IP addresses and collisions between the addresses it leases. For IPv6, the mechanism is called "duplicate address detection."

If the device that uses the ECGA as its address moves to another network, the ECGA parameters used to compute one or more of the first and second hash values may be modified 1118, and a new ECGA may be computed based on one or more modified ECGA parameters by returning to computing 1104 the second hash value or returning to computing 1112 the first hash value. The CGA Parameters may be modified 1118 in any suitable manner. For example the modifier may be incremented or recomputed, the collision count may be reset to zero or incremented, and the like.

In one example, the collision count 310 value allowed in ECGA generation may be capped. For example, as shown in FIG. 4 and FIG. 13, the encoded CGA Parameters structure 304 may be incremented in step 420. The collision count may be compared 422 to a predetermined maximum number of allowed collisions, such as three. If there have been a predetermined number of collisions (such as three), the process may terminate. If the process terminates, an error may be reported at step 424. If the process does not terminate, the address generation process may begin a new with computing a new first hash value 412 with the incremented collision count value.

If no address collision has been detected, the process may terminate 1120 successfully as shown in FIGS. 11 and 12. In a successful termination, in one example, shown in FIG. 4, a CGA Parameters data structure defined in IETF RFC 3972 is created by concatenating the modifier, routing prefix, collision count, public key (which may be stored in a DER-encoded ASN.1 SubjectPublicKey data item), and possible extension fields.

A self-signed certificate 316 (e.g., a X.509 v3 certificate, or any other suitable certificate) may be created and signed 426 using the public key 300. The certificate may be in any suitable form and may include any appropriate parameters to aid in verifying the ECGA. For example, the certificate may be created using the public key (which may be stored in a SubjectPublicKey data item). The certificate may include an extension (such as an extnValue data item) which encodes one or more of the CGA parameters used in generating either or both the first hash value and the second hash value. The CGA parameters included in the certificate or optimized parameter format may include the hash indicator, in addition to or alternative to including the second hash indicator in the ECGA.

In some cases, for example, in protocols using an optimized parameter format (e.g., the CGA Parameters data structure defined in IETF RFC 3972) rather than a certificate, creating and signing 426 may be skipped, and the optimized parameter format may be created instead. The certificate and/or optimized parameter format may be generated in the methods illustrated in either or both FIGS. 11 and 12.

As explained above, the first hash value 502 may create a portion of (such as 59 bits) of an interface identifier 504 (which may have 64 bits) in the address 314. The second hash function increases the cost of brute-force attacks, i.e., where the attacker varies the hash input in order to match its own public key with somebody else's address. In addition to matching the 59 address bits with the first hash value, an attacker must match the predetermined number of zero bits (e.g., the left-most zero bits) with a second hash value, as indicated by a security parameter and/or a zero count parameter which may be included in the ECGA as noted above. As noted above, the predetermined number of zero bits may be N*Sec or the number of zero bits in the selected second hash value using a time parameter. This technique, called hash extension, effectively increases the hash length beyond the 64-bit boundary of earlier proposals. In the N*Sec example, the resulting level of security is equal to a hash length of 59+N*Sec bits.

In some cases, if the routing prefix 308 of the address changes but the address owner's public key 300 does not, the old value of the modifier 306 may be used. In this manner, it may be unnecessary to repeat the brute-force search of steps 404 through 410 of FIG. 4 (or steps 1104-1108) if the routing prefix 308 is not included in the computation of the second hash value 500.

Authentication of Extensible Cryptographic Addresses

The authentication of ECGAs may be performed as defined in IETF RFC3972, which is incorporated herein by reference. The procedure for the authentication is the same regardless of whether the ECGA generation procedure takes as input a Sec value that determines the number of zero bits in the second hash value or a time parameter that determines the time used for the ECGA generation.

Figure 6:
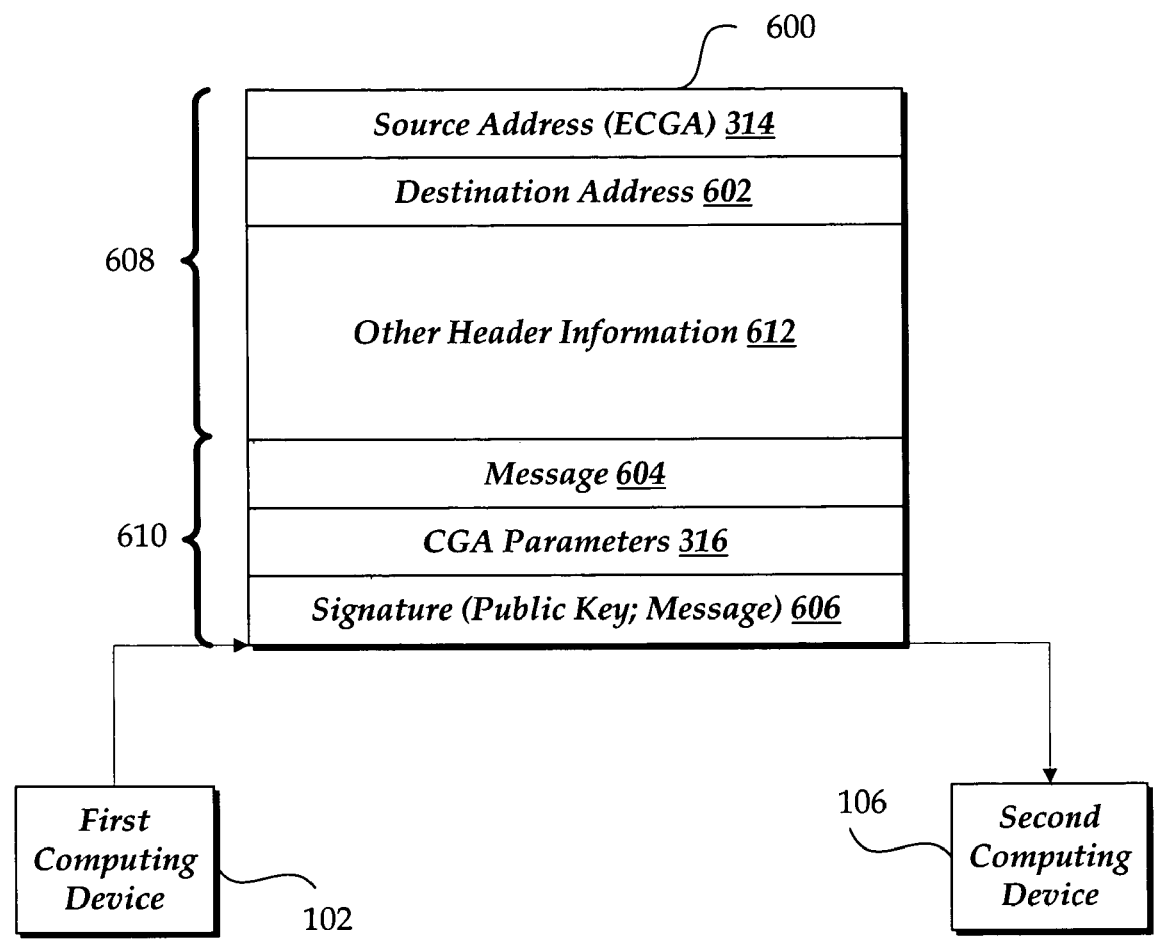
FIG. 6 is a schematic diagram showing example components of an authenticated message sent from the sending device to a receiving device.
Figure 7:
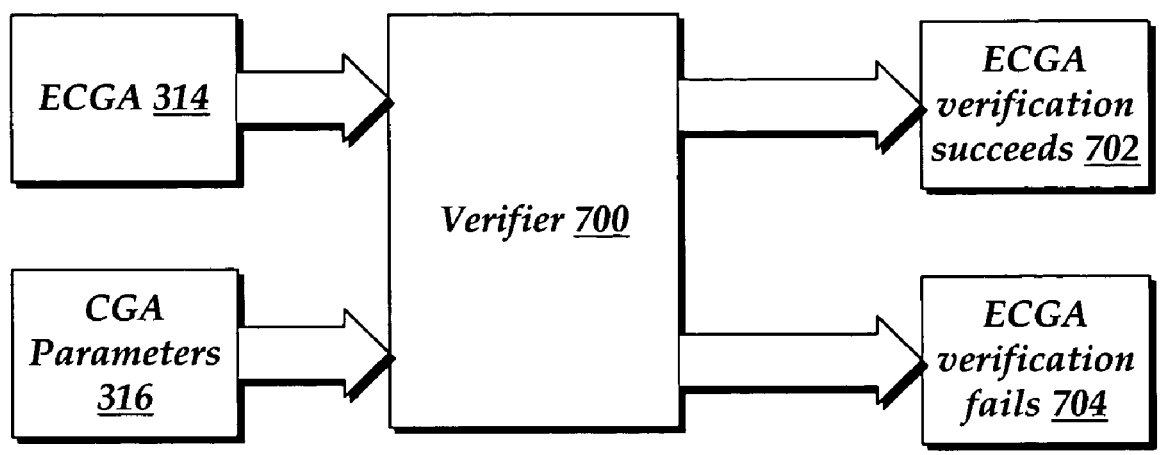
FIG. 7 is a schematic diagram showing example inputs and example outputs of an example address ownership verification procedure.

By constructing the unique ECGA 314 of the computing device 102 based on its public key 300, an association between the ECGA 314 of the computing device 102 and its public key 300 is created. This association allows a recipient 106 in FIG. 6 of a message to authenticate the computing device 102 as the sender of the message by verifying the association and a signature on the message. In order to authenticate a message as coming from a specific ECGA address 314, as the address owner, the computing device 102 may sign the message with its public key 300. As illustrated in FIG. 6, the computing device 102 then sends to the computing device 106 the packet 600 which may include the message 604, the signature 606, and the CGA parameters data structure 316. The receiving computing device may verify the ECGA such as by using the public key of the sender, one or more of the CGA parameters used to generate the first and/or second hash values, and/or the hash indicator such as the number of zero bits in a predetermined portion of the second hash value.

Referring now to FIGS. 6, 7, 8, and 9, the computing device 102 sends the message 600 to the recipient computing device 106 which may be configured similarly to or different form the computing device 102 illustrated in FIG. 2. The message 600 may contain any suitable content, among other things, such as one or more of a standard and/or non-standard IP header 608 and a message body 610. The IP header 608 may include one or more of the source address 314, the destination address 602, and any other suitable header information 612. The body 610 of the message 600 may include one or more of a message 604, a CGA parameters data structure, a digital signature 606 such as that created during the address generation process, and any other suitable information. The message content data 604 may be in plain-text (i.e., not hashed or encrypted). The digital signature 606 may be generated from data included in the message.

When the computing device 106 receives the authenticated message 600, the receiving computing device 106 may employ a verifier 700 (FIG. 7) to attempt to authenticate the identity of the sender of the message. The CGA verifier 700 in FIG. 7 may take one or more inputs from the received message 600 to verify the sender. For example, the ECGA verifier may take the senders address 314 and the CGA parameters 316.

The verifier 700 may output an indication 702 that the message 600 is trustworthy. If the verifier 700 provides the indication 702 that the message is trustworthy, the verifier knows that the CGA parameters 316 contain the public key 300 of the address owner 102. The verifier 700 may then use the public key 300 to authenticate signed messages 600 from the address owner 102 or to exchange a session key with the address owner 102. If the sender cannot be verified, the verifier may output an indication 704 that the message cannot be authenticated.

Figure 8:
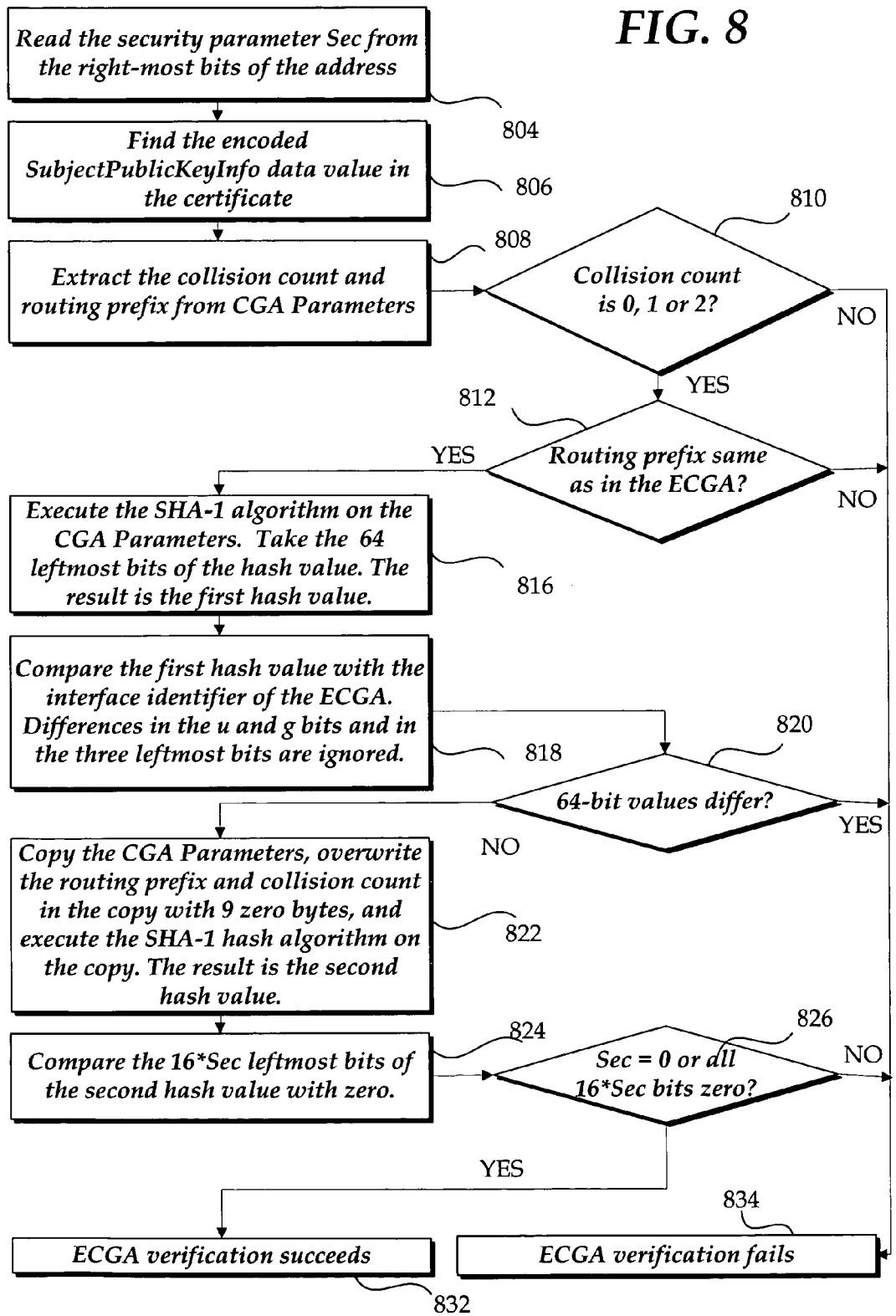
FIG. 8 is a flowchart of an example procedure for verifying that a public key belongs to the owner of an extensible cryptographically generated address.
Figure 9:
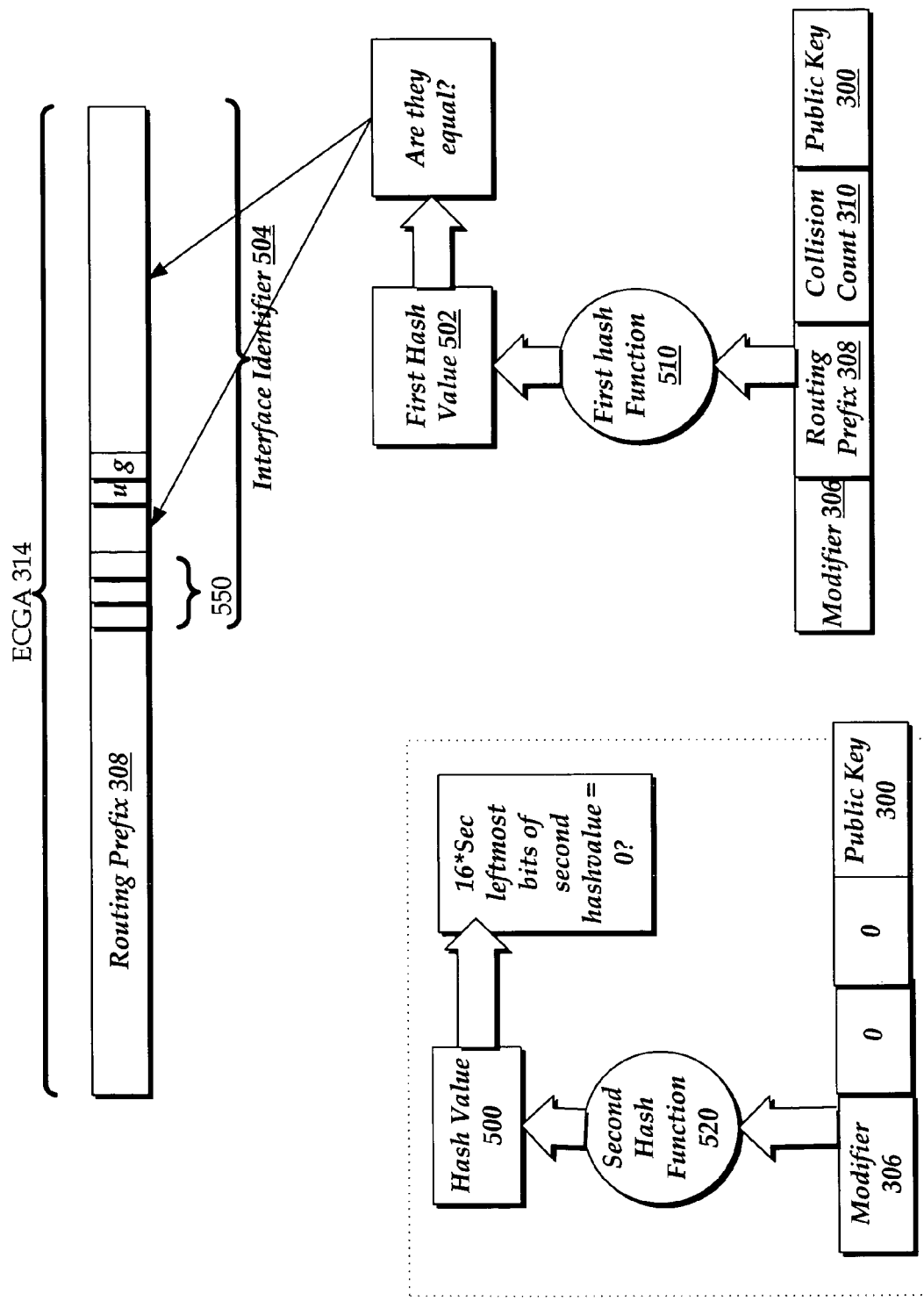
FIG. 9 is a schematic diagram showing an example verification of a binding between a public key and an extensible cryptographically generated address by a receiving device.

FIGS. 8 and 9 illustrate an example verification process executable by the verifier 700. Initially, the address 314 may be recognized as an ECGA. For example, the "u" and "g" bits in the address may be compared at step 800 to one. If either bit is zero, the address 314 is a non-CGA address and verification may not be possible or necessary 834. Alternatively, some other mechanism may be used to indicate that the address is an ECGA, or this may be deduced from the context or other protocol messages. For example, some protocols may require some addresses to be ECGAs. Continuing with step 804, the security parameter Sec 302 or number of zero bits in the second hash value may be read from the predetermined portion of the ECGA. For example, the security parameter or the number of zero bits may be read from the three leftmost bits of the interface identifier of the address 314. Next, in step 806, the value of the public key 300 is determined. For example, the public key may be retrieved from an authorized provider, retrieved from the CGA parameters 316, or the public key may be retrieved in any suitable manner. The value of the public key may be a SubjectPublicKeyInfo data value.

In step 808, the CGA parameters (such as the CGA Parameters data structure) may be found and decoded. For example, the CGA parameters may be received from the address owner with the signed message or it may be communicated in some other way, such as via an online database. The value of the collision count 310 may checked to determine if it is less than the predetermined maximum number of collisions, which as noted above may be three. Thus, in one example, the value of the collision count may be checked to determine if it is 0, 1, or 2. If not, verification fails in step 834. Next, in step 812, the value of the data for the routing prefix 308, which may be stored in the CGA Parameters structure 304 316, may be checked to determine whether it is equal to the routing prefix (i.e., the leftmost 64 bits or another number of bits depending on the protocol) of the address 314 in the message 600. If they differ, the verification may fail in step 834. If verification fails, any suitable responsive action may be taken, such as the verifier 700 may issue an indication 704 (of FIG. 7) that the authentication of the message 600 (of FIG. 6) has failed verification.

The public key 300 and one or more data values of the CGA parameters (which may be stored in the CGA Parameters structure 304) may be combined, such as concatenated, in step 816. The appropriate first hash algorithm (e.g., SHA-1 algorithm) may then be executed on the combination. The result is the value for first hash value.

In step 818, the predetermined part (e.g., leftmost 64 bits) of the computed first hash value may be compared with the interface identifier 504 of the address 314 (i.e., the rightmost 64 bits of the address). Differences in predetermined bit settings, such as the "u" and "g" bits and in the predetermined bits storing the security parameter/time parameter (e.g., the three leftmost bits of the interface identifier) may be ignored. If the 64-bit values differ (other than in the predetermined bit values), the verification may fail 834 and in response, the verifier 700 may issue the indication 704 that the ECGA verification process has failed.

If the interface identifier of the ECGA matches the selected portion of the computed first hash value, the data values for the public key 300 and the modifier 306 may be combined 822. For example, the public key and the modifier 306 from the CGA Parameters data structure may be concatenated. For another example, the routing prefix and collision count in the CGA parameters may be set to zero. The second hash function (e.g., the SHA-1 algorithm) is then executed on the combination. The result is a value for the second hash value. In step 824, the bits in a predetermined portion (e.g., left-most bits) of the second hash value may be compared 824 to zero or to another predetermined value. In one example, the number of zero bits in the predetermined portion may be compared to the value N*Sec where the security parameter Sec may be extracted from the ECGA. If any one of the N*Sec bits is non-zero, the verification may fail 834. In response, the verifier 700 may issue the indication 704, which says the authentication process has failed. If Sec equals zero, then authentication or verification never fails from step 824 since the number of leftmost bits of the second hash value to compare is zero (i.e., 16*0=0).

If the address authentication succeeds at step 832, the verifier 700 knows that the public key 300 belongs to the owner of the address 314. The verifier 700 of the computing device has authenticated the address 314 as the ECGA of the computing device 102 which sent the packet 600. The recipient computing device 106 may then be free to accept the message content data 604 as authentic and may act accordingly.

Figure 10:
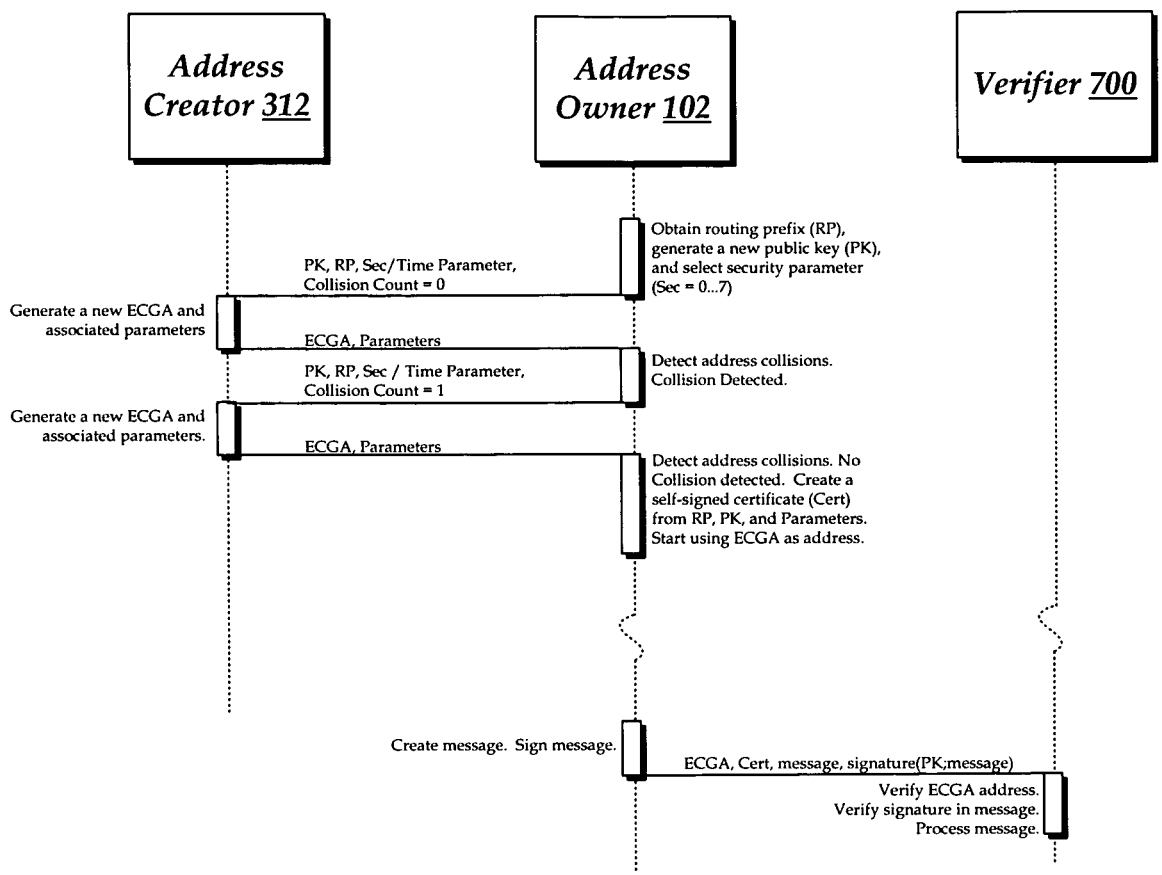
FIG. 10 is a sequence diagram showing an example lifecycle of the authentication process.

Referring to FIG. 10, an example full life cycle of the authentication process is illustrated as a message sequence diagram. The process begins with the address owner (i.e., the computing device 102) providing the input to the address creator (i.e., generator 312). The input may include the public key, the security value and/or time parameter, the initial collision count of zero, and/or an appropriate routing prefix. The address creator receiving the inputs may generate a protocol compliant ECGA based upon the inputs and the public key. The address generator may return the computed ECGA and the CGA parameters to the address owner. The address owner may determine if a collision has occurred with the generated ECGA. If so, the address owner may increment the collision count and request a new ECGA from the address creator. The request may contain one or more of the input parameters, and/or the address creator may store the input parameters for a time until no collision is detected. If no collisions are detected, the address owner can start using the address for communication. The ECGA may then be used to route a message through the network. For example, the address owner may create a message and may sign the message with its public key. The message may be sent to a recipient which may access a verifier to authenticate the message. The sent message may contain the sender's network address, e.g., the ECGA, the CGA parameters, the message, and the signature of the message. The verifier may verify the message, e.g., verify that the ECGA corresponds to the CGA parameters and that the signature is verifiable, and the like.

While using a value for security value 302 and/or time parameter above zero is optional when the computing device generates the packet 600 for transmission to the recipient computing device 106, the address verifier 700, may support all security parameter values. More particularly, the authentication procedure may require a constant amount of computation and/or may be relatively fast, regardless of the value of the security or time parameters. Moreover, if verifiers did not support higher security values, there may be less incentive for an address owner to use ECGAs.

The values of modifier 306 and collision count 310 in the CGA Parameters data structure may be ignored in the process of authentication executed by the verifier 700, except for checking that collision count is in the allowed range in step 810 and including both values in the appropriate hash inputs in steps 816 and 822.

The verifying party can be the same entity as the message creating party. For example, the computing device 102 creates messages 600 and stores them locally or remotely in one of the storage device 206 or 208 in FIG. 2. At a later time, the computing device retrieves the messages 600 and employs the verifier 700, which may be local, to authenticate the retrieved messages. In fact, the present invention is employable in any situation in which a message is retrieved and its integrity needs to be checked in order to provide some enhanced level of confidence that it is safe to process.

In protocols where the self-signed certificate is used rather than the optimized parameter format (e.g., CGA Parameters data structure defined in IETF RFC 3972), the signature verification may be added. For simplicity, it is suggested that all protocols that use the certificate 316 require the verification of its signature and validity period.

Further Embodiments of ECGAs

ECGA-based authentication may be attractive for performance and cost. For example, ECGAs may be used as a backup when there is no appropriate PKI certificate available, or when contacting an on-line authority has too high a performance penalty. In many cases, there may be no or reduced problems in combining ECGA-based authentication with other equally strong authentication methods.

Applications of Unilateral Authentication

As described above, the authentication mechanism for ECGAs associates an authenticated message with its creator. ECGA authentication of ownership may be applicable to applications other than those described above. Potential applications for ECGA-based authentication include proof of address ownership in secure neighbor discovery and duplicate address (collision) detection, Mobile IPv6 binding update authentication, key exchange for opportunistic IPSec encryption and authentication, and the like.

The protocol (such as IPv6) address autoconfiguration, duplicate address (collision) detection (DAD), and neighbor discovery (ND) may be threatened by denial-of-service attacks. One vulnerability of protocols is that it is not clear who owns an IP address and who is authorized to control the mapping between an IP address and link-layer addresses. For example, in stateless autoconfiguration, an IPv6 node picks an arbitrary IPv6 address in the network where it is located and sends a broadcast message to check that nobody else is already using the same address. An attacker can prevent other nodes from obtaining an IP address by responding to all duplicate address detection messages and claiming to be using any address that the target nodes pick. Implementation of ECGAs may reduce this dilemma in that duplicate address detection messages could be authenticated using the message address and associated public key.

Neighbor discovery is the IPv6 equivalent of ARP, i.e., a protocol for mapping IP addresses into link-layer addresses. One vulnerability of mapping IP addresses to link-layer addresses is that an attacker can redirect packets away from their right next-hop destination by spoofing neighbor discovery messages. ECGA addresses can reduce or prevent the attacks described above. In many cases ECGA addresses may be particularly suitable for securing these protocols because the goal is to authenticate an IP address and not some higher-level identifier. A node can create a new ECGA address and then prove its ownership of the address by signing the DAD messages. Similarly, signatures on ND messages may prevent or reduce the spoofing attacks. In both protocols, individual IP packets are signed. Thus, the optimized parameter format may be appropriate for these applications.

In an example of the Mobile IPv6 draft specification, the mobile node informs its correspondents about its current location by sending binding updates which must be authenticated to prevent denial-of-service attacks. The current Mobile IPv6 draft uses a relatively weak, non-cryptographic authentication method based on the assumption that some network routes are likely to be secure. An alternative may be to use ECGA-based public-key authentication. ECGA addresses may be particularly suitable for this purpose because Mobile IP uses IP addresses as the only node identifier. ECGA-based authentication may also reduce the number of protocol messages. Thus, there may be a case for specifying ECGA-based authentication as an optional optimization to Mobile IPv6. If both end nodes of a connection have an ECGA address, the end nodes may use the ECGAs in a key exchange and create an IPSec security association for encryption and data authentication. This kind of authentication may be done "opportunistically", i.e., whenever both end nodes support ECGA. The benefits of opportunistic protection may include one or more of preventing IP source spoofing attacks, privacy against passive eavesdropping, and reducing filtering of IP packets by network intermediaries. In many cases, the sending and receiving nodes are authenticating each other's IPv6 addresses, not the host names or users. In this case, the ECGA-based authentication may prevent IP source-address spoofing but not DNS spoofing where the attacker interferes with the mapping of domain names to IP addresses. In the future, Secure DNS may give a reasonable assurance of the authenticity of IP addresses. Together, Secure DNS and ECGA may provide strong authentication of hosts by their domain names. There have also been proposals for storing PKI certificates or public keys in the DNS. An advantage of combining ECGAs with Secure DNS is that the name service need not store the public keys. It only needs to provide a reliable binding between host names and addresses, which is its original function.

For further information see Tuomas Aura, "Cryptographically Generated Address (CGA)", January 2003, submitted for publication, which is herein incorporated in its entirety for everything it describes.

Those skilled in the art will realize that storage devices utilized to store program instructions can be distributed across a network. For example a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Having described and illustrated the principles of our invention with reference to the illustrated embodiments, it will be recognized that certain modifications, permutations, additions and sub-combinations thereof of the illustrated embodiments can be made without departing from such principles. It is therefore intended that the following appended claims and claims hereafter introduced are interpreted to include all such modifications, permutations, additions, sub-combinations, and their equivalents as are within their true sprit and scope.

In view of the many possible embodiments to which the principles of this invention may be applied, it should be recognized that the embodiments described herein with respect to the drawing figures are meant to be illustrative only and should not be taken as limiting the scope of invention. For example, for performance reasons the cryptographic operations may be implemented in hardware, such as on a network card, rather than in software. Therefore, the invention as described herein contemplates all such embodiments as may come within the scope of the following claims and equivalents thereof.

What is claimed is:

1. A method for generating a network address, the method comprising:
   a) generating by a computing device an interim hash value based on a combination of at least one cryptographically generated address parameter and a public key, wherein a modifier is included in the at least one cryptographically generated address parameter;
   b) modifying the modifier;
   c) repeating the operations of generating and modifying until a stop condition, the stop condition including a time limit specified by a time parameter to generate a plurality of interim hash values;
   d) terminating the computing when the stop condition is met, the stop condition further comprising a probability below a threshold probability that a more secure hash value will be generated within a remaining time of the time limit;
   e) selecting by the computing device a second hash value from the plurality of interim hash values;
   f) generating by the computing device a first hash value based on the second hash value; and
   g) concatenating a portion of the network address that is not node-selectable and at least a portion of the first hash value to form the network address of the computing device.

2. The method of claim 1, wherein concatenating includes concatenating a hash indicator with the portion of the address that is not node selectable and the at least a portion of the first hash value.

3. The method of claim 2, wherein the hash indicator includes a count of zero bits in a selected portion of the second hash value.

4. The method of claim 2, wherein the hash indicator replaces a portion of the at least a portion of the first hash value.

5. The method of claim 1, wherein generating the first hash value includes generating the first hash value based on a combination of the at least one cryptographically generated address parameter, the portion of the network address that is not node-selectable, and the public key.

6. The method of claim 5, further comprising detecting a collision between the network address and an existing network address, and incrementing a collision count parameter of at least one cryptographically generated address parameter.

7. The method of claim 5, wherein generating the first hash value includes generating the first hash value based on a combination of the at least one cryptographically generated address parameter, the portion of the network address that is not node-selectable, the collision count parameter, and the public key.

8. The method of claim 1, wherein the stop condition includes comparing with a specified threshold a probability of generating another interim hash value that would be selected instead of one of the already generated ones within a specified period of time.

9. The method of claim 8, further comprising computing the stop condition on a logarithmic scale of probability, on a logarithmic scale of computation time, or in units of hash bits.

10. A method for a computing device to derive a node-selectable portion of a network address from a public key of the computing device, the method comprising:
    a) computing by a computing device a plurality of hash values using a second hash function until a stop condition, the stop condition including computing the plurality of hash values for a time limit specified by a time parameter, an input for each hash value in the plurality of hash values including a concatenation of a public key and a modifier, wherein the modifier is included in at least one cryptographically generated address parameter and is modified during repeating of computing operations;
    b) terminating the computing operation when the stop condition is met, the stop condition further comprising a probability below a threshold probability that a more secure hash value will be generated within a remaining time of the time limit;
    c) selecting by the computing device a second hash value from the plurality of hash values;
    d) generating by the computing device a hash indicator indicating the selected second hash value;
    e) computing by the computing device a first hash value using a first hash function, the input to the first hash function including a concatenation of the public key and the modifier;
    f) setting at least a portion of a node-selectable portion of a network address of the computing device to a portion of the first hash value.

11. The method of claim 10, wherein generating the hash indicator includes an indication of a number of zero bits in a portion of the second hash value.

12. The method of claim 11, further comprising encoding the hash indicator into at least a portion of the node-selectable portion of the network address.

13. The method of claim 10, wherein selecting the second hash value includes selecting a hash value in the plurality of hash values having the greatest number of zero bits in a predetermined portion of the hash value.

14. The method of claim 13, wherein selecting the second hash value includes comparing a second computed hash value of the plurality of hash values with a first computed hash value of the plurality of hash values, selecting a hash value from the first and the second computed hash values based on a number of zero bits in a predetermined portion of the hash value.

15. The method of claim 14, further comprising storing the modifier used to compute the selected hash value associated with a hash indicator indicating the number of zero bits.

16. The method of claim 14, wherein the stop condition includes comparing with a specified threshold a probability of generating another one of the plurality of hash values that would be selected instead of one of the already generated plurality of has values within a specified period of time.

17. The method of claim 16, further comprising computing the stop condition on a logarithmic scale of probability, on a logarithmic scale of computation time, or in units of hash bits.

18. One or more computer readable storage media having computer executable components being executed by a processor to generate a network address of a computing device, comprising:
   a) means for generating a plurality of interim hash values using a second hash function until a stop condition, the stop condition including computing the plurality of interim hash values for a time limit specified by a time parameter, each interim hash value having an input including a concatenation of a public key and a modifier, wherein the modifier is included in at least one cryptographically generated address parameter and is modified during repeating of computing operations;
   b) means for terminating the means for generating the plurality of interim hash values when the stop condition is met, the stop condition further comprising a probability below a threshold probability that a more secure hash value will be generated within a remaining time of the time limit;
   c) means for selecting a second hash value from the plurality of interim hash values;
   d) means for generating a hash indicator indicating the selected second hash value;
   e) means for computing a first hash value, the input to the first hash function including a concatenation of the public key and the modifier; and
   f) means for generating a network address of the computing device based on at least a portion of the first hash value.

19. The one or more computer readable media of claim 18, further comprising, means for resolving a collision between the generated network address and an existing network address.

* * * * *